United States Patent
Hoek et al.

(10) Patent No.: US 10,618,013 B2
(45) Date of Patent: Apr. 14, 2020

(54) NANOCOMPOSITE MEMBRANES AND METHODS OF MAKING AND USING SAME

(75) Inventors: Eric M. V. Hoek, Los Angeles, CA (US); Yushan Yan, Riverside, CA (US); Byeong-Heon Jeong, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 11/364,885

(22) Filed: Feb. 27, 2006

(65) Prior Publication Data
US 2011/0027599 A1 Feb. 3, 2011

Related U.S. Application Data

(60) Provisional application No. 60/660,428, filed on Mar. 9, 2005.

(51) Int. Cl.
*B01D 69/14* (2006.01)
*B01D 61/02* (2006.01)
(Continued)

(52) U.S. Cl.
CPC ......... *B01D 69/141* (2013.01); *B01D 61/027* (2013.01); *B01D 65/08* (2013.01);
(Continued)

(58) Field of Classification Search
CPC .................................................... B01D 69/141
(Continued)

(56) References Cited

U.S. PATENT DOCUMENTS

| 3,133,132 A | 5/1964 | Loeb et al. | ...... 264/49 |
| 3,133,137 A | 5/1964 | Loeb et al. | ...... 264/49 |

(Continued)

FOREIGN PATENT DOCUMENTS

| CA | 2023691 | 8/1990 |
| DE | 19912582 | 3/1999 |

(Continued)

OTHER PUBLICATIONS

Alexandre, et al., "Polymer-layered silicate nanocomposites: preparation, properties and uses of a new class of materials," *Materials Science and Engineering*, 28:1-63 (2000).

(Continued)

*Primary Examiner* — Alex A Rolland
(74) *Attorney, Agent, or Firm* — Foley & Lardner LLP; Mark J. Danielson

(57) ABSTRACT

Disclosed are nanocomposite membranes and methods for making and using same. In one aspect, the nanocomposite membrane comprises a film comprising a polymer matrix and nanoparticles disposed within the polymer matrix, wherein the film is substantially permeable to water and substantially impermeable to impurities. In a further aspect, the membrane can further comprise a hydrophilic layer. In a further aspect, the nanocomposite membrane comprises a film having a face, the film comprising a polymer matrix, a hydrophilic layer proximate to the face, and nanoparticles disposed within the hydrophilic layer, wherein the film is substantially permeable to water and substantially impermeable to impurities. This abstract is intended as a scanning tool for purposes of searching in the particular art and is not intended to be limiting of the present invention.

21 Claims, 3 Drawing Sheets

(51) Int. Cl.
*B01D 65/08* (2006.01)
*B01D 67/00* (2006.01)
*C02F 1/461* (2006.01)
*B01D 71/38* (2006.01)
*B82Y 30/00* (2011.01)
*B01D 71/56* (2006.01)
*C02F 1/44* (2006.01)

(52) U.S. Cl.
CPC ..... *B01D 67/0079* (2013.01); *B01D 67/0093* (2013.01); *B01D 71/38* (2013.01); *B01D 71/56* (2013.01); *B82Y 30/00* (2013.01); *C02F 1/4618* (2013.01); *B01D 2321/168* (2013.01); *B01D 2323/30* (2013.01); *B01D 2325/48* (2013.01); *C02F 1/44* (2013.01); *C02F 2001/4619* (2013.01); *C02F 2305/08* (2013.01); *Y02A 20/131* (2018.01); *Y10T 428/3175* (2015.04)

(58) Field of Classification Search
USPC .............. 427/244, 245; 210/500.38, 504
See application file for complete search history.

(56) References Cited

U.S. PATENT DOCUMENTS

| | | | |
|---|---|---|---|
| 3,791,526 A | 2/1974 | Stana et al. .................. 210/321 |
| 4,060,488 A | 11/1977 | Hoover et al. ............... 210/433 |
| 4,188,418 A | 2/1980 | Livingston .................... 427/245 |
| 4,244,824 A | 1/1981 | Lange et al. ............... 210/500.2 |
| 4,277,344 A * | 7/1981 | Cadotte ........................ 210/654 |
| 4,353,802 A | 10/1982 | Hara |
| 4,471,110 A | 9/1984 | Christell |
| 4,740,219 A | 4/1988 | Kulprathipanja et al. ........ 55/16 |
| 4,762,619 A | 8/1988 | Gaddis et al. ................ 210/639 |
| 4,765,897 A * | 8/1988 | Cadotte et al. ............ 210/500.23 |
| 4,765,915 A | 8/1988 | Diehl |
| 4,769,148 A | 9/1988 | Fibiger et al. ........... 210/500.38 |
| 4,812,270 A | 3/1989 | Cadotte |
| 4,824,574 A | 4/1989 | Cadotte |
| 4,859,384 A | 8/1989 | Fibiger et al. ............... 264/45.1 |
| 4,872,984 A | 10/1989 | Tomaschke ............ 210/500.38 |
| 4,911,844 A | 3/1990 | Linder et al. ................ 210/638 |
| 4,948,506 A | 8/1990 | Lonsdale .................... 210/490 |
| 4,950,404 A | 8/1990 | Chau |
| 4,971,697 A | 11/1990 | Douden et al. ............ 210/502.1 |
| 4,983,291 A | 1/1991 | Chau |
| 5,002,590 A | 3/1991 | Friesen et al. |
| 5,019,261 A | 5/1991 | Stengaard .................... 210/490 |
| 5,024,594 A | 6/1991 | Athayde et al. ............... 428/246 |
| 5,028,337 A | 7/1991 | Linder et al. ................ 210/642 |
| 5,032,282 A | 7/1991 | Linder |
| 5,049,282 A | 9/1991 | Linder |
| 5,091,086 A | 2/1992 | Stengaard .................... 210/490 |
| 5,102,547 A * | 4/1992 | Waite et al. .................. 210/501 |
| 5,104,632 A | 4/1992 | Douden et al. ............... 423/335 |
| 5,108,607 A | 4/1992 | Kraus et al. ............. 210/500.39 |
| 5,130,025 A | 7/1992 | Lefebvre et al. ............ 210/638 |
| 5,160,617 A | 11/1992 | Huis In't Veld et al. .... 210/490 |
| 5,173,189 A | 12/1992 | Hoshi et al. |
| 5,190,654 A | 3/1993 | Bauer ........................ 210/490 |
| 5,262,054 A | 11/1993 | Wheeler ...................... 210/639 |
| 5,269,926 A | 12/1993 | Webster et al. ......... 210/500.25 |
| 5,342,431 A | 8/1994 | Anderson et al. ................ 95/45 |
| 5,368,889 A * | 11/1994 | Johnson ............... B01D 69/125 427/244 |
| 5,376,442 A | 12/1994 | Davidson et al. ............ 428/307 |
| 5,543,046 A | 8/1996 | Van Rijn .................... 210/490 |
| 5,576,057 A | 11/1996 | Hirose et al. ................ 427/245 |
| 5,614,099 A | 3/1997 | Hirose et al. ................ 210/653 |
| 5,650,479 A | 7/1997 | Glugla et al. |
| 5,733,602 A | 3/1998 | Hirose et al. ................ 427/245 |
| 5,755,964 A | 5/1998 | Mickols .................. 210/500.37 |
| 5,756,207 A | 5/1998 | Clough |
| 5,800,706 A | 9/1998 | Fischer ...................... 210/198.2 |
| 5,843,351 A | 12/1998 | Hirose et al. ................ 264/45.1 |
| 5,876,602 A | 3/1999 | Jons et al. ............... 210/500.38 |
| 5,914,039 A | 6/1999 | Mahendran et al. .... 210/500.25 |
| 5,938,934 A | 8/1999 | Balogh et al. ................ 210/688 |
| 5,989,426 A | 11/1999 | Hirose et al. ........... 210/500.38 |
| 6,015,495 A * | 1/2000 | Koo et al. ................ 210/500.38 |
| 6,024,872 A | 2/2000 | Mahendran et al. .... 210/500.25 |
| 6,024,873 A | 2/2000 | Hirose et al. ........... 210/500.38 |
| 6,117,341 A | 9/2000 | Bray et al. .................... 210/791 |
| 6,187,192 B1 | 2/2001 | Johnston et al. ........... 210/502.1 |
| 6,241,893 B1 | 6/2001 | Levy ........................... 210/660 |
| 6,284,137 B1 | 9/2001 | Hajikano et al. ........ 210/500.41 |
| 6,309,546 B1 | 10/2001 | Herrmann et al. ...... 210/500.25 |
| 6,413,425 B1 * | 7/2002 | Hachisuka et al. ...... 210/500.38 |
| 6,425,936 B1 | 7/2002 | Sammons et al. .............. 95/45 |
| 6,551,536 B1 | 4/2003 | Kwak et al. ................ 264/45.1 |
| 6,562,266 B2 | 5/2003 | Mickols ....................... 264/41 |
| 6,582,495 B2 | 6/2003 | Chau |
| 6,585,802 B2 | 7/2003 | Koros et al. .................... 95/51 |
| 6,605,140 B2 | 8/2003 | Guiver et al. .................... 96/4 |
| 6,626,980 B2 * | 9/2003 | Hasse et al. ..................... 95/51 |
| 6,753,396 B2 | 6/2004 | Ulbricht et al. ............ 526/517.1 |
| 6,755,900 B2 | 6/2004 | Koros .............................. 96/10 |
| 6,824,689 B2 * | 11/2004 | Wang et al. .................. 210/660 |
| 6,841,075 B2 | 1/2005 | Penth et al. .................. 210/650 |
| 6,869,532 B2 | 3/2005 | Arnold |
| 6,878,278 B2 | 4/2005 | Mickols |
| 6,890,436 B2 | 5/2005 | Komatsu et al. ......... 210/500.41 |
| 7,018,538 B2 | 3/2006 | Leiser et al. ................ 210/635 |
| 7,138,006 B2 | 11/2006 | Miller |
| 7,166,146 B2 | 1/2007 | Miller |
| 7,264,650 B2 | 9/2007 | Lou |
| 7,329,311 B2 | 2/2008 | Zeller |
| 7,485,233 B2 | 2/2009 | Vane |
| 7,534,287 B2 | 5/2009 | Zeller |
| 7,604,746 B2 | 10/2009 | Childs et al. ................ 210/640 |
| 7,718,112 B2 | 5/2010 | Drew |
| 7,749,414 B2 | 7/2010 | Bitterlich |
| 7,866,487 B2 | 1/2011 | Sueoke |
| 8,029,857 B2 | 10/2011 | Hoek |
| 2002/0074282 A1 | 6/2002 | Herrmann et al. ........... 210/490 |
| 2003/0116503 A1 | 6/2003 | Wang et al. .................. 210/660 |
| 2003/0121844 A1 | 7/2003 | Koo et al. .................... 210/490 |
| 2003/0132174 A1 | 7/2003 | Isomura et al. .............. 210/767 |
| 2003/0140789 A1 | 7/2003 | William |
| 2003/0180526 A1 * | 9/2003 | Winey et al. ................ 428/323 |
| 2004/0178135 A1 | 9/2004 | Beplate ..................... 210/321.6 |
| 2005/0051479 A1 | 3/2005 | Mahendran |
| 2005/0077243 A1 | 4/2005 | Pinnau et al. ................ 210/652 |
| 2005/0139066 A1 | 6/2005 | Miller et al. ..................... 95/45 |
| 2005/0173341 A1 | 8/2005 | Salinaro ....................... 210/636 |
| 2005/0230305 A1 | 10/2005 | Kulkarni et al. ........ 210/500.23 |
| 2006/0063911 A1 | 3/2006 | Cayton et al. ................ 528/425 |
| 2006/0175256 A1 | 8/2006 | Masten et al. ................ 210/638 |
| 2006/0201884 A1 | 9/2006 | Kulprathipanja et al. .... 210/651 |
| 2009/0272692 A1 | 11/2009 | Kurth et al. ..................... 210/65 |
| 2010/0025330 A1 | 2/2010 | Ratto et al. .................. 210/651 |
| 2010/0224555 A1 | 9/2010 | Hoek |
| 2011/0027599 A1 | 2/2011 | Hoek |

FOREIGN PATENT DOCUMENTS

| | | |
|---|---|---|
| EP | 348041 | 5/1989 |
| JP | 58-079505 | 5/1983 |
| JP | 59-199001 | 11/1984 |
| JP | 05-115760 | 5/1993 |
| JP | 05 245349 | 9/1993 |
| JP | 08-182921 | 7/1996 |
| JP | 10-033959 | 2/1998 |
| JP | 10-066845 | 3/1998 |
| JP | 10-176106 | 6/1998 |
| JP | 2000-117076 | 4/2000 |
| JP | 2000-237559 | 9/2000 |
| JP | 2001-286741 | 10/2001 |
| JP | 2002-348468 | 12/2002 |
| JP | 2004-097918 | 4/2004 |
| JP | 2006-187731 | 7/2006 |
| KR | 10-1998-068304 | 10/1998 |

(56) References Cited

FOREIGN PATENT DOCUMENTS

| KR | 10-2004-0005050 | 1/2004 |
|---|---|---|
| KR | 10-2005-0077141 | 8/2005 |
| WO | WO 1999/001208 | 1/1999 |
| WO | WO 2000/056431 | 9/2000 |
| WO | WO 2003/097218 | 11/2003 |
| WO | WO 2004/046031 A1 | 6/2004 |
| WO | WO 2005/014266 | 2/2005 |
| WO | WO 2006/098872 | 9/2006 |
| WO | WO07/001405 | 1/2007 |
| WO | WO 2009/039467 | 3/2009 |

OTHER PUBLICATIONS

Al-Zubari, "Towards the establishment of a total water cycle management and re-use program in the GCC countries," *Desalination*, 120:3-14 (1998).
Asano, et al., "Wastewater Reclamation, Recycling, and Reuse: Past, Present, and Future," *Water Science Technology*, 33(10-11):1-14 (1996).
Baayens, et al., "Hydrodynamic resistance and flux decline in asymmetric cellulose acetate reverse osmosis membranes," *Journal of Applied Polymer Science*, 16:663-670 (1972).
Baker, "Membrane Technology and Applications," Second ed., Wet Sussex: John Wiley & Sons Ltd. 139-149 (2004).
Bakir, "Sustainable wastewater management for small communities in the Middle East and North Africa," *Journal of Environmental Management*, 61:319-328 (2001).
Barth, et al., "Asymmetric polysulfone and polyethersulfone membranes: effects of thermodynamic conditions during formation on their performance," *Journal of Membrane Science*, 169:287-299 (2000).
Boom, et al., "Microstructures in phase inversion membranes. Part 2. The role of a polymeric additive," *Journal of Membrane Science*, 73:277-292 (1992).
Boussu, et al., "Characterization of polymeric nanofiltration membranes far systematic analysis of membrane performance," *Journal of Membrane Science*, 278:418-427 (2006).
Calvert, "Potential applications of nanotubes, in Carbon Nanotubes," CRC Press: Boca Raton. p. 277-292 (1997).
Chazeau, et al., "Viscoelastic properties of plasticized PVC reinforced with cellulose whiskers," *Journal of Applied Polymer Science*, 71:1797-1808 (1999).
Ebert, et al., "Influence of inorganic fillers on the compaction behavior of porous polymer based membranes," *Journal of Membrane Science*, 233:71-78 (2004).
Elimelech, et al., "Membrane separations in aquatic systems," *Environmental Engineering Science*, 19(6):341 (2002).
Favier, et al., "Mechanical percolation in cellulose whiskers nanocomposites," *Polymer Engineering Science*, 37:1732-1739 (1997).
Flemming, "Biofouling in water systems—cases, causes and countermeasures," *Applied Microbiology and Biotechnology*, 59(6):629-640 (2002).
Freger, "Nanoscale heterogeneity of polyamide membranes formed by interfacial polymerization," *Langmuir*, 19(11):4791-4797 (2003).
Fried, "Polymer Science and Technology," 2nd ed., Upper Saddle River: Prentice Hall Professional Technical Reference, 315-317 (2003).
Ghosh, et al., "Nano-structured compaction resistant thin film composite membranes," (Abstract) 2006 AIChE Meeting.
Goosen, et al., "Fouling of Reverse Osmosis and Ultrafiltration Membranes: A Critical Review," *Separation Science and Technology*, 39(10):2261-2297 (2004).
MWH, "Water Treatment Principles and Design," Second ed. 2005, Hoboken: John Wiley & Sons. 1448.
Hirose, et al., Effect of skin layer surface structures on the flux behaviour of RO membranes, *J. Membrane Sci*, 121(2):209-215 (1996).

Hoek, "Colloidal fouling mechanisms in reverse osmosis and nanofiltration," in: *Chem. Eng.*, Yale University: New Haven, CT. p. 207 (2002).
Jeong, et al., "Hydrophilic and Antibiotic RO Membranes for Wastewater Reclamation", American Water Works Association, Membrane Technology Conference, presented Mar. 9, 2005.
Jeong, et al., "Nanoparticles for hydrophilic and Antimicrobial surface coatings," (Abstract) 2006 AIChE Annual Meeting.
Jeong, et al., "Synthesis and characterization of TFC membranes for water reuse," (Abstract) Prepared for the 2006 AIChE Annual Meeting.
Jia, et al., "Moleculare sieving effect of the zeolite-filled silicone rubber membranes in gas permeation," *Journal of Membrane Science*, 57:289-296 (1991).
Jonsson, "The influence of pressure in the compaction of asymmetric cellulose acetate membranes, in Delyannis and Delyannis in 6th International Symposium in Fresh Water from Sea," Athens (1978).
Jonsson, "Methods for determining the selectivity of reverse osmosis membranes," Desalination, 24:19-37 (1978).
Kabsch-Korbutowicz, et al., "Analysis of membrane fouling in the treatment of water solutions containing humic acids and mineral salts," *Desalination*, 126:179-185 (1999).
Khedr, "Development of reverse osmosis desalination membranes composition and configuration: future prospects," Desalination, 153:295-304 (2002).
Klepetsaniis, et al., "Precipitation of calcium sulfate dihydrate at constant calcium activity," *Journal of Crystal Growth*, 98:480-486 (1989).
Kwak, et al., "Details of surface features in aromatic polyamide reverse osmosis membranes characterized by scanning electron and atomic force microscopy," *Journal of Polymer Science Part B—Polymer Physics*, 37(13):1429-1440 (1999).
Lee, et al., "Effect of operating conditions on CaSO4 scale formation mechanism in nanofiltration for water softening," *Water Research*, 34(15):3854-3866 (2000).
Lemanski, et al., "Effect of shell-side flows on the performance of hollow-fiber gas separation modules," *Journal of Membrane Science*, 195:215 (2002).
Lobo, "Handbook of Zeolite Science and Technology," ed. P.K. Dutta, New York: Marcel Dekker, Inc. 65-66 (2003).
Lohokare, et al., "Effect of support material on ultrafiltration membrane performance," *Journal of Applied Polymer Science*, 99(6):3389-3395 (2006).
Mahendran, et al., "Preparation, characterization and effect of annealing on performance of cellulose acetate/sulfonated polysulfone and cellulose acetate/epoxy resin blend ultrafiltration membranes," *European Polymer Journal*, 40:623-633 (2004).
Malaisamy, et al., "Polyurethane and sulfonated polysulfone blend ultrafiltration membranes I. Preparation and characterization studies," *Journal of Colloid and Interface Science*, 254:129-140 (2002).
Mark, "Ceramic reinforced polymers and polymer-modified ceramics," *Polymer Engineering Science*, 36:2905-2920 (1996).
Nygaard, et al., "Mechanisms and control of irreversible fouling in commercial and nano-structured RO/NF membranes," (Abstract) 2006 AIChE Annual Meeting.
Ochoa, et al., "Effect of hydrophilicity on fouling of an emulsified oil wastewater with PVDF/PMMA membranes," *Journal of Membrane Science*, 226:203-211 (2003).
Okazaki, et al., Scale formation on reverse osmosis membranes. *Journal of Chemical Engineering of Japan*, 17(2):145-151 (1984).
Orelovitch, et al., "Preparation of porous polymer samples for SEM: combination of photo oxidation degradation with a freeze fracture technique," *Materials Chemistry and Physics*, 81:349-351 (2003).
Perepelkin, "Inverse evaluation of the integral ordering of the structure and defectiveness of fibres and yarns for technical applications based on normalized values of the mechanical properties," *Fibre Chemistry*, 28(5):326-335 (1996).
Persson, et al., "Study of membrane compaction and its influence on ultrafiltration water permeability," *Journal of Membrane Science*, 100:155-162 (1995).
Pervov, "Scale formation prognosis and cleaning procedure schedules in reverse osmosis systems operation," *Desalination*, 83:77-118 (1991).

(56) References Cited

OTHER PUBLICATIONS

Prabhaker, et al., "Studies on the structural, kinetic and thermodynamic parameters of cellulose acetate membranes," *Journal of Membrane Science*, 29:143-153 (1986).

Rabiller-Baudry, et al., "Application of a Convection-Diffusion-Electrophoretic Migration Model to Ultrafiltration of Lywoyme at Different pH Values and Ionic Strengths", Journal of Membrane Science, 179:163-174 (2000).

Reynaud, et al., "Nanophase in polymers," *Rev. Metall /Cah. Inf. Tech.*, 96:169-176 (1999).

Roh, et al., "Effects of the polyamide molecular structure on the performance of reverse osmosis membranes," *Journal of Polymer Science Part B—Polymer Physics*, 36(11):1821-1830 (1998).

Rong, et al., "Structure-property relationships of irradiation grafted nano-inorganic particle filled polypropylene composites," *Polymer*, 42:167-183 (2001).

Rowsell, et al. Metal-organic frameworks: A new class of porous materials, *Micro- and Mesoporous Mater.*, 73:3-14 (2004).

Sawyer, et al., "Basic Concepts from Colloid Chemistry, in Chemistry for Environmental Engineering and Science," McGraw-Hill: New York City, p. 360-373 (2002).

Sivakumar, et al., "Preparation and performance of cellulose acetate polyurethane blend membranes and their applications II," *Journal of Membrane Science*, 169:215-228 (2000).

Sivakumar, et al., "Studies on cellulose acetate-polysulfone ultrafiltration membranes II. Effect of additive concentration," *Journal of Membrane Science*, 268:208-219 (2005).

Sivakumar, et al., "Ultrafiltration application of cellulose acetate polyurethane blend membranes," *European Polymer Journal*, 35:1647-1651 (1999).

Stern, et al., "Helium Recovery by Permeation," *Ind. Eng. Chem.*, 57:49 (1965).

Suleiman, et al., "Analysis of an RO plant to remedy the water shortage in the rural area of Damascus," *Desalination*, 177:281-289 (2005).

Tansel, et al., "Characterization of fouling kinetics in ultrafiltration systems by resistances in series model," *Desalination*, 129:7-14 (2000).

Tarnawski, et al., "Estimation of compaction and fouling effects during membrane processing of cottage cheese whey," *Journal of Food Engineering*, 5:75-90 (1986).

Tay, et al., "Nonlinear behavior of permeate flux in full-scale reverse osmosis processes," *Journal of Environmental Engineering*, 131(11):1481-1487 (2005).

Tian, L., et al., "A historical opportunity: economic competitiveness of seawater desalination project between nuclear and fossil fuel while the world oil price over $50 per boe-part A: MSF," *Desalination*, 183:317-325 (2005).

Troup, et al., "Scale nucleation on a heat transfer surface and its prevention," *Chemical Engineering Commun.*, 2:167-180 (1978).

Uragami, et al., "Studies on Syntheses and Permeabilities of Special Polymer Membranes. 28. Permeation Characteristics and Structure of Interpolymer Membranes from Poly(vinylidene fluoride) and Poly(styrene sulfonic acid)," *Desalination*, 34:311-323 (1980).

Van Gauwbergen, et al., "Modeling of scaleup of reverse osmosis separation," *Environmental Engineering Science*, 19:37-45 (2002).

Velikova, et al., "Comparative evaluation of industrial membranes: correlation between transport and operational parameters," *Desalination*, 94:1-10 (1993).

Von Werne, et al., "Preparation of structurally well defined polymer-nanoparticle hybrids with controlled/living radical polymerization," *Journal of American Chemical Society*, 121:7409-7410 (1999).

Walker, et al., "A novel asymmetric clamping cell for measuring streaming potential of flat surfaces," *Langmuir*,18(6):2193-2198 (2002).

Winters, "Control of Organic Fouling at Two Seawater Reverse Osmosis Plants," *Desalination*, 66:319-325 (1987).

Xing, et al., "Fouling and cleaning in an ultrafiltration membrane bioreactor for municipal wastewater treatment," *Separation Science and Technology*, 38:1773-1789 (2003).

Ye, et al., "Influences of porosity on mechanical and wear performance of pseudoelastic TiNi-matrix composites," Journal of Materials Engineering and Performance, 10(2):178-185 (2001).

Bae, et al., "Preparation of $TiO_2$ Self-Assembled Polymeric Nanocomposite Membranes and Examination of Their Fouling Mitigation Effects in a Membrane Bioreactor System," 2005, Journal of Membrane Science, vol. 266, p. 1-5.

Bae, et al., "Effect of $TiO_2$ Nanoparticles on Fouling Mitigation of Ultrafiltration Membranes for Activated Sludge Filtration," Journal of Membrane Science, 2005, vol. 249, p. 1-8.

Baudry, et al., "Application of a Convection-Diffusion-Electrophoretic Migration Model to Ultrafiltration of Lywoyme at Different pH Values and Ionic Strengths", 2000, Journal of Membrane Science, vol. 179, p. 163-174.

Belfer, et al., Surface Modification of Commercial Polyamide Reverse Osmosis Membranes by Radical Grafting, 1998, Acta Polymerica, vol. 49, p. 574.

Belfer, et al., "Surface Modification of Commercial Composite Polyamide Reverse Osmosis Membranes," 1998, Journal of Membrane Science, vol. 139, p. 175.

Belfer, et al., Effect of Surface Modification in Preventing Fouling of Commercial SWRO Membranes at the Eilat Seawater Desalination Pilot Plant, 2001, Desalination, vol. 139, p. 169.

Bosc, et al., "Mesoporous Anatase Coatings for Coupling Membrane Separation and Photocatalyzed Reactions", 2005, vol. 265, p. 13-19.

Brant, et al., Assessing Short-Range Membrane-Colloid Interactions Using Surface Energetics, 2002, Journal of Membrane Science, vol. 203, p. 257.

Cadotte, et al., "New Thin-Film Composite Seawater Reverse-Osmosis Membrane," Desalination, 1980, vol. 32, p. 25.

Cadotte, et al., "Nanofiltration Membranes Broaden the Use of Membrane Separation Technology," 1988, Desalination, vol. 70, p. 77.

Chiang, et al., "Separation of Liquid-Mixtures by Using Polymer Membranes," 1991, Journal of Applied Polymer Science, vol. 43, p. 2005-2012.

Comstock, D.L., "Desal-5 Membrane for Water Softening," 1989, Desalination, vol. 76, p. 61.

Elimelech, et al., "Role of Membrane Surface Morphology in Colloidal Fouling of Cellulose Acetate and Composite Aromatic Polyamide Reverse Osmosis Membranes," 1997, Journal of Membrane Science, vol. 127, p. 101.

Flemming, H.C., Mechanistic Aspects of Reverse Osmosis Membrane Biofouling and Pevention, 1992.

Flemming, et al., "Biofouling—The Achilles Heel of Membrane Processes," 1997, Desalination, vol. 113, p. 215.

Freger, "TFC Polyamide Membranes Modified by Grafting of Hydrophilic Polymers," 2002, vol. 209, p. 283-292.

Gilron, et al., "Effects of Surface Modification on Antifouling and Performance Properties of Reverse Osmosis Membranes," 2001, Desalination, vol. 140, p. 167-179.

Hammond, P.T., "Recent Explorations in Electrostatic Multilayer Thin Film Assembly," 1999, Current Opinion in Colloid & Interface Science, vol. 4, p. 430-442.

Hoek, et al., "Effect of Surface Roughness on Colloid-Membrane DLVO Interactions," 2003, Langmuir, vol. 19, p. 4836-4387.

Hoek, et al., "Influence of Crossflow Membrane Filter Geometry and Shear Rate on Colloidal Fouling in Reverse Osmosis and Nanofiltration Separations," 2002, Environmental Engineering Science, vol. 19, p. 357-373.

Hoek, et al., "Cake-Enhanced Concentration Polarization: A New Mechanism of Fouling for Salt Rejecting Membranes," 2003, vol. 37, p. 5581-5588.

Hong, et al., Chemical and Physical Aspects of Natural Organic Matter (nom) Fouling of Nanofiltration Membranes, 1997, Journal of Membrane Science, vol. 132, p. 159.

Kang, et al., Direct Observation of Biofouling in Cross-flow Microfiltration: Mechanisms of Deposition and Release, Journal of Membrane Science, 2004, vol. 244, p. 151-165.

Kim, et al., "Preparation of Interfacially Synthesized and Silicone-Coated Composite Polyamide Nanofiltration Membranes with High Performance", 2002, vol. 41, p. 5523-5528.

(56) References Cited

OTHER PUBLICATIONS

Kim, et al., "Design of $TiO_2$ Nanoparticle Self-Assembled Aromatic Polyamide Thin-Film-Composite (TFC) membrane as an approach to solve Biofouling Problem," Journal of Membrane Science, 2003, vol. 211, p. 157-165.
Kim, et al., "The Changes of Membrane Performance with Polyamide Molecular Structure in the Reverse Osmosis Process," 2000, Journal of Membrane Science, vol. 165.
Kim, et al., "Preparation of Fouling Resistant Nanofiltration and Reverse Osmosis Membranes and Their Use for Dyeing Wastewater Effluent," 2004, Journal of Industrial and Engineering Chemistry, vol. 10, p. 115-121.
Kurihara, et al., "Development of Cross-Linked Fully Aromatic Polyamide Ultra-Thin Composite Membranes for Seawater Desalination," 1994, Desalination, vol. 96, p. 133.
Kwak, et al, "Hybrid Organic/Inorganic Reverse Osmosis (RO) Membrane for Bactericidal Anti-Fouling/Preparation and Characterization of TiO2 Nanoparticle Self-Assembled Aromatic Polyamide Thin-Film-Composite (TFC) Membrane," Environmental Science and Technology, 2001, vol. 35, p. 2388-2394.
Kwak, et al., "Structure-Motion-Performance Relationship of Flux-Enhanced Reverse Osmosis (RO) Membranes Composed of Aromatic Polyamide Thin Films," 2001, Environmental Science & Technology, vol. 35, p. 4334.
Kwak, et al., "Relationship of Relaxation Property to Reverse Osmosis Permeability in Aromatic Polyamide Thin-Film-Composite Membranes," 1999, Polymer, vol. 40, p. 6361.
Kwak, et al., "Use of Atomic Force Microscopy and Solid-State NMR Spectroscopy to Characterize Structure-Property-Performance Correlation in High-Flux Reverse Osmosis (RO) Membranes," 1999, Journal of Membrane Science, vol. 158, p. 143.
Lang, et al., "A Study on the Preparation of Polyvinyl Alcohol Thin-Film Composite Membranes and Reverse Osmosis Testing," 1996, Desalination, vol. 104, p. 185-196.
Lang, et al., "Preparation and Testing of Polyvinyl-Alcohol Composite Membranes for Reverse-Osmosis," 1995, Canadian Journal of Chemical Engineering, vol. 73, p. 686.
Lang, et al., "Reverse-Osmosis Performance of Modified Polyvinyl-Alcohol Thin-Film Composite Membranes," 1994, Journal of Colloid and Interface Science, vol. 166, p. 239.
Li, et al., "The Impact of Ultraviolet Light on Bacterial Adhesion to Glass and Metal Oxide-Coated Surface," 2005, Colloids and Surfaces B—Biointerfaces, vol. 41, p. 153-161.
Li, et al., Organic Fouling and Chemical Cleaning of Nanofiltration Membranes: Measurements and Mechanisms, 2004, Environmental Science & Technology, vol. 38, p. 4683.
Ma, et al., "Membrane Surface Modification and Backpulsing for Wastewater Treatment," 2001, Separation Science and Technology, 2001, vol. 36, p. 1557-1573.
Ma, et al., "Membrane Fouling Reduction by Backpulsing and Surface Modification," 2000, Journal of Membrane Science, vol. 173, p. 191-200.
Marchin, et al., "Effect of Microgravity on *Escherichia coli* and MS-2 Bacteriophage Disinfection by Iodinated Resins," 1997, vol. 40, p. 65-68.
McDonnell, et al., "Hydrophilic and Antimicrobial Zeolite Coatings for Gravity-Independent Water Separation," Adv. Functional Mater, 2005, vol. 15, p. 336.
Mulder, M., "Basic Principles of Membrane Technology," 1996, Kluwer Academic Publishers, vol. Second.
Mulder, et al., "Principles of Membrane Technology," 1996, Kluwer Press, Amsterdam, The Netherlands, $2^{nd}$ Edition.
Petersen, R.J., "Composite Reverse-Osmosis and Nanofiltration Membranes," 1993, Journal of Membrane Science, vol. 83, p. 81.
Rao, et al., "Interfacially Synthesized Thin Film Composite RO membranes for Seawater Desalination", 1997, vol. 124, p. 263-272.
Rao, et al., "Structure-Performance Correlation of Polyamide Thin Film Composite Membranes: Effect of Coating Conditions on Film Formation," 2003, vol. 211, p. 13-24.
Sanden, et al., "Bactericidal Activities of Tri- and Penta-Iodinated Resins Against Legionella Pneumophila," 1992, Wat. Res., vol. 26, p. 365-370.
Sedlak, et al., "Understanding Microcontaminants in Recycled Water", 2000, American Chemical Society, vol. 34, p. 508 A-515A.
Vrijenhoek, et al., "Influence of Membrane Surface Properties on Initial Rate of Colloidal Fouling of Reverse Osmosis and Nanofiltration Membranes," 2001, Journal of Membrane Science, vol. 188, p. 115.
Wang, et al., "Nafion-bifunctional Silica Composite Proton Conductive Membranes", 2002, The Royal Society of Chemistry, vol. 12, p. 834-837.
Wang, et al., "Homogeneous Polymer-Zeolite Nanocomposite Membranes by Incorporating Dispersible Template-Removed Zeolite Nanocrystals," Journal of Materials Chemistry, 2002, vol. 12, p. 3640-3643.
Wang, et al., "Direct Observation of Microbial Adhesion to Membranes," 2005, Environmental Science & Technology, vol. 39, p. 6461-6469.
Zhang, et al., "Development and Characterization of Composite Nanofiltration Membranes and Their Application in Concentration of Antibiotics," 2003, Separation and Purification Technology, vol. 30, p. 27.
Zhu, et al., "Colloidal Fouling of Reverse Osmosis Membranes: Measurements and Fouling Mechanisms," 1997, Environmental Science & Technology, vol. 31, p. 3654.
Bae, et al., "Activated Carbon Membrane With Carbon Whisker," 2002, Water Research1-5.
Jons, et al., "Porous Latex Composite Membranes: Fabrication and Properties," 1999, Journal of Membrane Science, vol. 155, p. 79-99.
Xu, et al., "Synthesis of Nanoscale Bimetallic Particles in Polyelectrolyte Membrane Matrix for Reductive Transformation of Halogenated Organic Compounds," 2005, Journal of Nanoparticle Research, vol. 7, p. 449-467.
PCT, PCT/US2006/007037, Feb. 27, 2006, Hoek, Written Opinion, dated Sep. 6, 2006.
PCT, PCT/US2006/007037, Feb. 27, 2006, Hoek, International Search Report, dated Sep. 6, 2006.
PCT, PCT/US2006/007037, Feb. 27, 2006, Hoek, International Preliminary Report on Patentability, dated Sep. 12, 2007.
CN, 200680007751.X, Feb. 27, 2006, Hoek, Preliminary Amendment, dated Jul. 3, 2008 (Chinese translation filed Jul. 7, 2008).
CN, 200680007751.X, Feb. 27, 2006, Hoek, Office Action dated Jan. 9, 2009, Jan. 9, 2009.
CN, 200680007751.X, Feb. 27, 2006, Hoek, Response to Office Action dated Jan. 9, 2009, dated Jul. 20, 2009 (Chinese translation filed Jul. 24, 2009).
CN, 200680007751.X, Feb. 27, 2006, Hoek, Second Office Action dated Sep. 25, 2009, Sep. 25, 2009.
CN, 200680007751.X, Feb. 27, 2006, Hoek, Response to Office Action dated Sep. 25, 2009, dated Dec. 10, 2009.
CN, 200680007751.X, Feb. 27, 2006, Hoek, Third Office Action dated Apr. 1, 2010, Apr. 1, 2010.
AU, 2006223564, Feb. 27, 2006, Hoek, Request for Examination and Amendment, dated Jun. 23, 2009.
EP, 06736373.9, Feb. 27, 2006, Hoek, Preliminary Amendment, dated Dec. 19, 2007.
EP, 06736373.9, Feb. 27, 2006, Hoek, European Search Report, dated Jul. 20, 2009.
EP, 06736373.9, Feb. 27, 2006, Hoek, European Search opinion, dated Jul. 20, 2009.
EP, 06736373.9, Feb. 27, 2006, Hoek, Comm. from the Examining Division, dated Feb. 3, 2010.
EP, 06736373.9, Feb. 27, 2006, Hoek, Reply to comm. from the Exam. Division, dated Jun. 2, 2010.
JP, 2008-500751, Feb. 27, 2006, Hoek, Preliminary Amendment, dated Feb. 19, 2009.
SG, 200705942-1, Feb. 27, 2006, Hoek, Preliminary Amendment, dated Jun. 9, 2008.
SG, 200705942-1, Feb. 27, 2006, Hoek, Search and Examination Report, dated Sep. 29, 2009.
SG, 200705942-1, Feb. 27, 2006, Hoek, Certificate of Grant Issued, dated Mar. 31, 2010.

(56) References Cited

OTHER PUBLICATIONS

RU, 2007137124, Feb. 27, 2006, Hoek, Office Action dated Jan. 28, 2008, Jan. 28, 2008.
RU, 2007137124, Feb. 27, 2006, Hoek, Response to Office Action dated Jan. 28, 2008, dated Apr. 28, 2008.
RU, 2007137124, Feb. 27, 2006, Hoek, Office Action dated Dec. 2, 2009, Dec. 2, 2009.
IL, 185765, Feb. 27, 2006, Hoek, Translation of Office Action dated Jun. 17, 2009, dated Oct. 7, 2009.
PCT, PCT/US2007/082901, Oct. 28, 2007, Hoek, Written Opinion, dated May 22, 2008.
PCT, PCT/US2007/082901, Oct. 28, 2007, Hoek, International Search Report, dated May 22, 2008.
PCT, PCT/US2007/082901, Oct. 28, 2007, Hoek, International Preliminary Report on Patentability, dated Apr. 28, 2009.
EP, 07868609.4, Oct. 29, 2007, Hoek, Invitation to Remedy Deficiencies, dated Nov. 5, 2009.
EP, 07868609.4, Oct. 29, 2007, Hoek, Preliminary Amendment, dated Dec. 10, 2009.
EP, 07868609.4, Oct. 29, 2007, Hoek, Decision to Refuse, dated Feb. 23, 2010.
EP, 07868609.4, Oct. 29, 2007, Hoek, Amendment, dated Mar. 10, 2010.
EP, 07868609.4, Oct. 29, 2007, Hoek, Communication to Applicant, dated Apr. 29, 2010.
U.S. Appl. No. 11/927,521, filed Oct. 29, 2007, Hoek, Office Action dated May 20, 2010, May 20, 2010.
PCT, PCT/US2008/077146, Sep. 20, 2008, Hoek, Written Opinion, dated Nov. 21, 2008.
PCT, PCT/US2008/077146, Sep. 20, 2008, Hoek, International Search Report, dated Nov. 21, 2008.
PCT, PCT/US2008/077146, Sep. 20, 2008, Hoek, International Preliminary Report on Patentability, dated Mar. 24, 2010.
EP, 08831499.2, Sep. 20, 2008, Hoek, Preliminary Amendment, dated Jun. 15, 2010.
JP, 2010-526036, Sep. 20, 2008, Hoek, Preliminary Amendment, dated Jun. 10, 2010.
Japanese Office Action for corresponding Japanese Application No. 2008-500751, 6 pages, dated Jul. 21, 2011.
Japanese Office Action for corresponding Japanese Application No. 2008-500751, 4 pages, dated Jun. 1, 2012.
Japanese Office Action for related Japanese Application No. 2009-534927, 7 pages, dated May 18, 2012.
Korean Office Action for corresponding Korean Application No. 10-2007-7021418, 9 pages.
Tjong, "Structural and Mechanical Properties of Polymer Nanocomposites", *Materials Science and Engineering: R: Reports*, 53, 73-197 (2006).

\* cited by examiner

NANOCOMPOSITE MEMBRANES AND METHODS OF MAKING AND USING SAME

CROSS REFERENCE TO RELATED APPLICATIONS

This application claims the benefit of U.S. Application No. 60/660,428 filed Mar. 9, 2005, which is hereby incorporated herein by reference in its entirety.

BACKGROUND

Biofouling is a major concern with modern desalination membranes (e.g., reverse osmosis (RO) or nanofiltration (NF) membranes) because it cannot be easily eliminated and plagues many applications such as seawater and brackish water desalination, as well as conventional water and wastewater treatment. A breakthrough in the field of membrane separations was the development of thin film composite membranes, which are characterized by an ultra-thin "barrier" layer supported on a porous substrate. Among thin film composite membranes, polyamide thin film composite membranes have been widely commercialized for water purification applications such as seawater desalination, surface water treatment, and wastewater reclamation due to their excellent separation performance and energy efficiency.

In recent years, the water permeability of conventional polyamide thin film composite membranes has improved dramatically without an appreciable change in solute rejection. Polyamide thin film composite membranes are widely commercialized for use in RO separations such as seawater desalination, water treatment, and wastewater reclamation due to their excellent membrane selectivity. Despite this advantage, one concern with conventional polyamide (PA) thin film composite (TFC) membranes in these applications is their loss of performance due to biofouling, which typically cannot be eliminated by feed water pretreatment, membrane surface modification, module and process optimization, or chemical cleaning. S. Kang et al., Direct Observation of Biofouling in Cross-flow Microfiltration: Mechanisms of Deposition and Release, *Journal of Membrane Science* 244 (2004) 151. A small amount of microbial deposition can result in extensive biofilm growth, which in RO processes leads to higher operating pressures and more frequent chemical cleanings. This in turn can shorten membrane life and compromise product water quality.

Therefore, there remains a need for methods and compositions that overcome these deficiencies and that effectively provide for membranes having improved fouling resistance, anti-microbial (biocidal) activity, water permeability, and salt rejection.

SUMMARY

In accordance with the purpose(s) of the invention, as embodied and broadly described herein, the invention, in one aspect, relates to a nanocomposite membrane comprising a film comprising a polymer matrix comprising and nanoparticles disposed within the polymer matrix, wherein the film is substantially permeable to water and substantially impermeable to impurities. In a further aspect, the membrane can further comprise a hydrophilic layer.

In a further aspect, the invention relates to a nanocomposite membrane comprising a film comprising an interfacially-polymerized polyamide matrix and zeolite nanoparticles dispersed within the polymer matrix, wherein the film is substantially permeable to water and substantially impermeable to sodium ions. In a further aspect, the membrane can further comprise a hydrophilic layer.

In a further aspect, the invention relates to a method for preparing a nanocomposite membrane comprising the steps of providing a polar mixture comprising a polar liquid and a first monomer that is miscible with the polar liquid; providing an apolar mixture comprising an apolar liquid substantially immiscible with the polar liquid and a second monomer that is miscible with the apolar liquid; providing nanoparticles in either the polar mixture or the apolar mixture, wherein the nanoparticles are miscible with the apolar liquid and miscible with the polar liquid; and contacting the polar mixture and the apolar mixture at a temperature sufficient to react the first monomer with the second monomer, thereby interfacially-polymerizing the first monomer and the second monomer to form a polymer matrix, wherein the nanoparticles are disposed within the polymer matrix.

In a further aspect, the invention relates to a method for preparing a nanocomposite membrane comprising the steps of soaking a polysulfone membrane in an aqueous solution comprising m-phenylenediamine, and pouring onto the soaked polysulfone membrane a hexane solution comprising trimesoyl chloride and zeolite nanoparticles suspended in the hexane solution, thereby interfacially-polymerizing the m-phenylenediamine and the trimesoyl chloride to form a film, wherein the zeolite nanoparticles are dispersed within the film.

In a further aspect, the invention relates to a nanocomposite membrane comprising a film having a face, wherein the film comprises a polymer matrix; a hydrophilic layer proximate to the face; and nanoparticles disposed within the hydrophilic layer, wherein the film is substantially permeable to water and substantially impermeable to impurities.

In a further aspect, the invention relates to a method for preparing a nanocomposite membrane comprising the steps of providing an aqueous mixture comprising water, a hydrophilic polymer, nanoparticles, and optionally, at least one crosslinking agent; providing a polymer film that is substantially permeable to water and substantially impermeable to impurities; contacting the mixture and the film, thereby forming a hydrophilic nanocomposite layer in contact with the film; and evaporating at least a portion of the water from the hydrophilic nanocomposite layer.

In a further aspect, the invention relates to the products produced by the methods of the invention.

In a further aspect, the invention relates to methods for purifying water comprising the steps of providing the nanocomposite membranes of the invention or the products of the invention, wherein the membrane has a first face and a second face; contacting the first face of the membrane with a first solution of a first volume having a first salt concentration at a first pressure; and contacting the second face of the membrane with a second solution of a second volume having a second salt concentration at a second pressure; wherein the first solution is in fluid communication with the second solution through the membrane, wherein the first salt concentration is higher than the second salt concentration, thereby creating an osmotic pressure across the membrane, and wherein the first pressure is sufficiently higher than the second pressure to overcome the osmotic pressure, thereby increasing the second volume and decreasing the first volume.

In a further aspect, the invention relates to methods for concentrating an impurity comprising the steps of providing the nanocomposite membranes of the invention, wherein the membrane has a first face and a second face; contacting the first face of the membrane with a first mixture of a first volume having a first impurity concentration at a first pressure; contacting the second face of the membrane with a second mixture of a second volume having a second impurity concentration at a second pressure; and collecting the impurity, wherein the first mixture is in fluid communication with the second solution through the membrane, wherein the first impurity concentration is higher than the second impurity concentration, thereby creating an osmotic pressure across the membrane, and wherein the first pressure is sufficiently higher than the second pressure to overcome the osmotic pressure, thereby increasing the second volume and decreasing the first volume.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several embodiments and together with the description serve to explain the principles of the invention.

DETAILED DESCRIPTION

Figure 1:
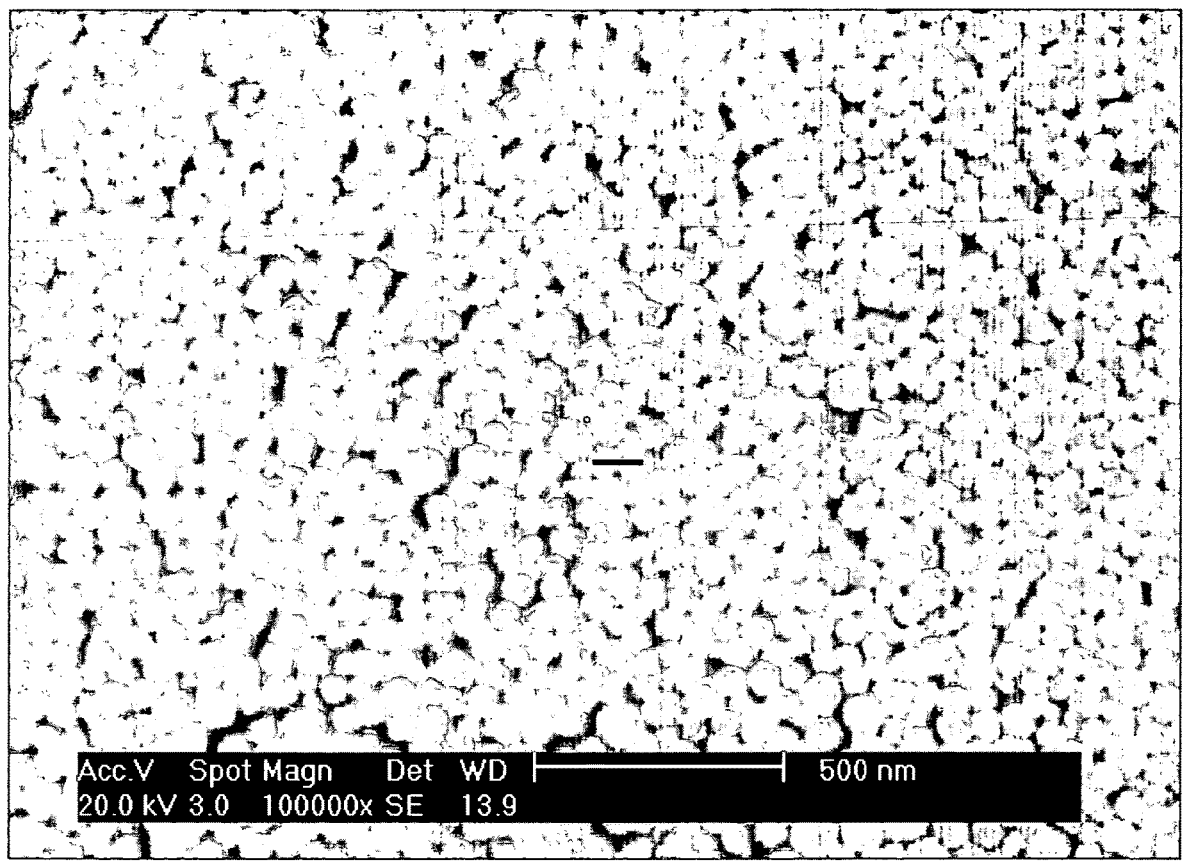
FIG. 1 shows SEM images of as synthesized Zeolite A nanoparticles.

The present invention may be understood more readily by reference to the following detailed description of aspects of the invention and the Examples included therein and to the Figures and their previous and following description.

Before the present compounds, compositions, articles, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular embodiments only and is not intended to be limiting.

A. DEFINITIONS

Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein may be different from the actual publication dates, which may need to be independently confirmed.

As used in the specification and the appended claims, the singular forms "a," "an" and "the" include plural referents unless the context clearly dictates otherwise. Thus, for example, reference to "a component," "a polymer," or "a particle" includes mixtures of two or more such components, polymers, or particles, and the like.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that throughout the application, data is provided in a number of different formats and that this data represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —$OCH_2CH_2O$— units in the polyester, regardless of whether ethylene glycol was used to prepare the polyester. Similarly, a sebacic acid residue in a polyester refers to one or more —$CO(CH_2)_8CO$— moieties in the polyester, regardless of whether the residue is obtained by reacting sebacic acid or an ester thereof to obtain the polyester.

As used herein, the terms "optional" or "optionally" means that the subsequently described event or circumstance may or may not occur, and that the description includes instances where said event or circumstance occurs and instances where it does not.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B—F, C-D, C-E, and C—F are considered disclosed. Likewise, any subset or combination of these is also disclosed. Thus, for example, the sub-group of A-E, B—F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. REVERSE OSMOSIS AND NANOFILTRATION MEMBRANES

Reverse osmosis membranes and nanofiltration membranes can be used to separate dissolved or dispersed materials from feed streams. The separation process typically involves bringing an aqueous feed solution into contact with one surface of the membrane under pressure so as to effect permeation of the aqueous phase through the membrane while permeation of the dissolved or dispersed materials is prevented.

Both reverse osmosis and nanofiltration membranes typically include a thin film discriminating layer fixed to a porous support, collectively referred to as a "composite membrane." Ultrafiltration and microfiltration membranes may also have a composite arrangement. The support provides physical strength but offers little resistance to flow due to its porosity. On the other hand, the discriminating layer can be less porous and can provide the primary means of separation of dissolved or dispersed materials. Therefore, it is generally the discriminating layer which determines a given membrane's "rejection rate"—the percentage of the particular dissolved material (i.e., solute) rejected, and "flux"—the flow rate per unit area at which the solvent passes through the membrane.

Reverse osmosis membranes and nanofiltration membranes vary from each other with respect to their degree of permeability to different ions and organic compounds. Reverse osmosis membranes are relatively impermeable to virtually all ions, including sodium and chloride ions, as well as uncharged solutes with molecular weights above about 200 Daltons. Therefore, reverse osmosis membranes are widely used for the desalination of brackish water or seawater to provide a highly purified water for industrial, commercial, or domestic use because the rejection rate of sodium and chlorine ions for reverse osmosis membranes is usually greater than about 90 percent.

Conventional nanofiltration membranes are more specific for the rejection of ions. Generally, nanofiltration membranes reject divalent ions, including radium, magnesium, calcium, sulfate, and carbonate. In addition, nanofiltration membranes are generally impermeable to organic compounds having molecular weights above about 1,000 Daltons. Additionally, nanofiltration membranes generally have higher fluxes at comparable pressures than reverse osmosis membranes. These characteristics render nanofiltration membranes useful in such diverse applications as the "softening" of water and the removal of pesticides from water. As an example, nanofiltration membranes generally have a sodium chloride rejection rate of from about 0 to about 50 percent but can reject salts such as magnesium sulfate from about 50 to about 99 percent.

Among particularly useful membranes for reverse osmosis and nanofiltration applications are those in which the discriminating layer is a polyamide. The polyamide discriminating layer for reverse osmosis membranes is often obtained by an interfacial polycondensation reaction between a polyfunctional amine monomer and a polyfunctional acyl halide monomer (also referred to as a polyfunctional acid halide) as described in, for example, U.S. Pat. No. 4,277,344. The polyamide discriminating layer for nanofiltration membranes is typically obtained via an interfacial polymerization between a piperazine or an amine substituted piperidine or cyclohexane and a polyfunctional acyl halide as described in U.S. Pat. Nos. 4,769,148 and 4,859,384. Another way of obtaining polyamide discriminating layers suitable for nanofiltration is via the methods described in, for example, U.S. Pat. Nos. 4,765,897; 4,812,270; and 4,824,574. These patents describe changing a reverse osmosis membrane, such as those of U.S. Pat. No. 4,277,344, into a nanofiltration membrane.

Composite polyamide membranes are typically prepared by coating a porous support with a polyfunctional amine monomer, most commonly coated from an aqueous solution: Although water is a preferred solvent, non-aqueous solvents may be utilized, such as acetyl nitrile and dimethylformamide (DMF). A polyfunctional acyl halide monomer (also referred to as acid halide) is subsequently coated on the support, typically from an organic solution. Although no specific order of addition is necessarily required, the amine solution is typically coated first on the porous support followed by the acyl halide solution. Although one or both of the polyfunctional amine and acyl halide may be applied to the porous support from a solution, they may alternatively be applied by other means such as by vapor deposition, or neat.

Means for improving the performance of membranes by the addition of constituents to the amine and/or acyl halide solutions are described in the literature. For example, U.S. Pat. No. 4,950,404, issued to Chau, describes a method for increasing flux of a composite membrane by adding a polar aprotic solvent and an optional acid acceptor to the aqueous amine solution prior to interfacially polymerizing the amine with a polycarboxylic acid halide. Similarly, U.S. Pat. Nos. 6,024,873; 5,989,426; 5,843,351; 5,733,602; 5,614,099; and 5,576,057 to Hirosè et al. describe the addition of selected alcohols, ethers, ketones, esters, halogenated hydrocarbons, nitrogen-containing compounds and sulfur-containing compounds having a solubility parameter of 8 to 14 $(cal/cm^3)^{1/2}$ to the aqueous amine solution and/or organic acid halide solution prior to interfacial polymerization.

Methods of improving membrane performance by post-treatment are also known. For example, U.S. Pat. No. 5,876,602 to Jons et al. describes treating a polyamide composite membrane with an aqueous chlorinating agent to improve flux, lower salt passage, and/or increase membrane stability to base. U.S. Pat. No. 5,755,964 to Mickols discloses a process wherein the polyamide discriminating layer is treated with ammonia or selected amines, e.g., butylamine, cyclohexylamine, and 1,6 hexane diamine. U.S. Pat. No. 4,765,897 to Cadotte discloses the post treatment of a membrane with a strong mineral acid followed by treatment with a rejection enhancing agent.

C. NANOCOMPOSITE MEMBRANES

In one aspect, the membranes of the invention are a new class of filtration materials, for example, desalination membrane materials. In particular, the membranes of the invention can be inorganic-organic thin film nanocomposite membranes, which can result from the dispersion of inorganic nanoparticles such as zeolite or metal oxide nanoparticles in a starting monomer solution. The invention takes advantage of inherently advantageous properties of organic membranes (such as flexibility, high packing density in spiral wound elements, ease of manufacture, and good permeability and selectivity) with those of inorganic nanoparticles (such as high surface charge density, ion-exchange capacity, hydrophilicity, and biocidal capability). These inorganic-organic nanocomposite membranes can be prepared, for example, by an interfacial polymerization reaction, as is used in forming pure polyamide thin film composite membranes. The membranes of the invention can be used in conjunction with any of a large number of available nanomaterials that offer a wide range of possible particle sizes, hydrophilicity/hydrophobicity, pore sizes, porosity, interfacial reactivity, and chemical compositions.

One advantage of traditional thin film composite membranes is that the thin barrier layer and porous support layer can be independently modified to achieve an optimal mechanical, chemical, and thermal stability as well as flux and rejection, a.k.a., "selectivity."

A new advantage of thin film nanocomposite membranes involves independent selection and modification of nanoparticles to optimize further the selectivity of the membrane. As a result, the synthesized membrane structure can comprise inorganic nanoparticles embedded within a semi-permeable polymer film. The presence of nanoparticles, for example inorganic nanoparticles, can modify the membrane structure formed during interfacial polymerization and alter the macroscopic surface properties (e.g., surface charge, hydrophilicity, porosity, thickness, and roughness) in a favorable manner, which can lead to improved selectivity.

Another advantage of thin film nanocomposite membranes involves the potential to impart active fouling resistance or passive fouling resistance or both types of fouling resistance to the formed film. Passive fouling resistance, sometimes referred to as "passivation," describes modification of a surface to reduce surface reactivity and promote hydrophilicity. Passive fouling resistance can prevent unwanted deposition of dissolved, colloidal, or microbial matter on the membrane surface, which tends to foul the membrane and negatively influence flux and rejection. Active fouling resistance involves the modification of a surface to promote a selective, beneficial reactivity between the surface and a dissolved, colloidal, or microbial constituent. An example is the modification of nanoparticles to possess biocidal properties, and subsequently, embedding the nanoparticles in a polyamide film to produce a reverse osmosis or nanofiltration membrane with inherent antimicrobial properties.

The present invention provides a new class of "thin film nanocomposite" membranes with improved water permeability, solute rejection, and fouling resistance over conventional polyamide thin film composite membranes. Development of more efficient, more selective, and antimicrobial desalination membranes can revolutionize water and wastewater treatment practice. An additional advantage of the nanocomposite approach is that nanoparticles can be functionalized to produce practically any desired membrane surface properties, and thus, are easily dispersed in the initiator solution regardless of the solvent used. Therefore, the methods of the invention are amenable to immediate introduction into existing commercial membrane manufacturing processes without significant process modification.

In one aspect, the invention relates to a nanocomposite membrane comprising a film comprising a polymer matrix and nanoparticles disposed within the polymer matrix, wherein the film is substantially permeable to water and substantially impermeable to impurities. By "disposed," it is meant that at least about 50% of the volume of at least about 50% the nanoparticles are positioned between the surfaces of the film. For example, at least about 60%, at least about 70%, at least about 80%, or at least about 90% of the volume of at least about 50% the nanoparticles can be positioned between the surfaces of the film. As another example, at least about 50% of the volume of at least about 60%, at least about 70%, at least about 80%, or at least about 90% of the nanoparticles can be positioned between the surfaces of the film. In a further aspect, the nanoparticles can be substantially encapsulated within the film. By "encapsulated," it is meant that at least about 80% of the volume of at least about 50% of the nanoparticles is positioned between the surfaces of the film. For example, at least about 80% or at least about 90% of the volume of at least about 50% the nanoparticles can be positioned between the surfaces of the film.

Typically, the film can have at least two surfaces or faces; one of the surfaces or faces can be proximate a porous support. In one aspect, one of the surfaces or faces can be in contact with the support. In a further aspect, the membrane can further comprise a polysulfone, polyethersulfone, poly(ether sulfone ketone), poly(ether ethyl ketone), poly(phthalazinone ether sulfone ketone), polyacrylonitrile, polypropylene, cellulose acetate, cellulose diacetate, cellulose triacetate, or other porous polymeric support membrane.

In a further aspect, the membrane can comprise a film comprising an interfacially-polymerized polyamide matrix and zeolite nanoparticles dispersed within the polymer matrix, wherein the film is substantially permeable to water and substantially impermeable to sodium ions.

In a further aspect, the membrane can comprise a film having a face, wherein the film comprises a polymer matrix; a hydrophilic layer proximate to the face; and nanoparticles disposed within the hydrophilic layer, wherein the film is substantially permeable to water and substantially impermeable to impurities. In one aspect, the hydrophilic layer can be adjacent to the face. In a further aspect, the hydrophilic layer can be in contact with the face.

1. Impurities

Typically, the membranes of the invention can be prepared so as to be substantially impermeable to impurities. As used herein, "impurities" generally refers to materials dissolved, dispersed, or suspended in a liquid. The materials can be undesired; in such a case, the membranes can be used to remove the undesired impurities from the liquid, thereby purifying the liquid, and the liquid can be subsequently collected. The materials can be desired; in such a case, the membranes can be used to decrease the volume of the liquid, thereby concentrating the impurities, and the impurities can be subsequently collected. In one aspect, the membranes can be provided to be substantially impermeable to particular impurities, which can be selected from among impurities known to those of skill in the art. In a further aspect, the impurities can comprise at least one of sodium ions, potassium ions, magnesium ions, calcium ions, silicates, organic acids, or nonionized dissolved solids with a molecular weight of greater than about 200 Daltons or a mixture thereof. The impurities can be dissolved or dispersed within a liquid. The impurities can be hydrophobic or hydrophilic or neither or a mixture thereof. Exemplary impurities can include ions, neutral species, silicates, and organic compounds, for example, amines or carboxylic acids.

Ions can be monovalent ions, divalent ions, trivalent ions, higher valent ions, or a mixture thereof. In one aspect, the impurities comprise monovalent ions. The ions can be positive ions, negative ions, or a mixture thereof. Monovalent metal ions include lithium ions, sodium ions, potassium ions, rubidium ions, cesium ions, francium ions, ammonium ions, protonated primary amine ions, protonated secondary amine ions, and protonated tertiary amine ions. In addition, monovalent ions can be dissociated mineral or organic acids. In a further aspect, one or more of these types of ions are not among the impurities wherein a membrane of the invention is substantially impermeable.

In a further aspect, the impurities comprise divalent ions. The ions can be positive ions, negative ions, or a mixture thereof. Divalent ions include beryllium ions, magnesium ions, calcium ions, strontium ions, radium ions, ferrous iron, barium ions, strontium ions, and protonated diamines. In addition, divalent ions can be dissociated mineral or organic acids. In a further aspect, one or more of these types of ions are not among the impurities wherein a membrane of the invention is substantially impermeable.

In a further aspect, the impurities comprise higher valent ions. The ions can be positive ions, negative ions, or a mixture thereof. Higher valent ions include aluminum ions, ferric iron ions, or silica ions. In a further aspect, one or more of these types of ions are not among the impurities wherein a membrane of the invention is substantially impermeable.

Neutral species can include, for example, nonionized solids with a molecular weight of greater than about 200 Daltons. The molecular weight can be, for example, at least about 200 Daltons, at least about 250 Daltons, at least about 300 Daltons, at least about 350 Daltons, at least about 400 Daltons, at least about 500 Daltons, at least about 600 Daltons, at least about 700 Daltons, at least about 800 Daltons, at least about 900 Daltons, or at least about 1,000 Daltons. The neutral species can be dissolved or suspended. The neutral species can be hydrophobic, hydrophilic, both, or neither. In a further aspect, one or more of these types of neutral species are not among the impurities wherein a membrane of the invention is substantially impermeable.

Silicates can include all known compounds of Silicon and Oxygen based upon the $SiO_4$ tetrahedron-shaped anionic group, with or without one or more metal ions present. It is understood that the silicates can be present as solids with a molecular weight of greater than about 200 Daltons and can be dissolved or suspended. The molecular weight can be, for example, at least about 200 Daltons, at least about 250 Daltons, at least about 300 Daltons, at least about 350 Daltons, at least about 400 Daltons, at least about 500 Daltons, at least about 600 Daltons, at least about 700 Daltons, at least about 800 Daltons, at least about 900 Daltons, or at least about 1,000 Daltons. In a further aspect, one or more of these types of silicates are not among the impurities wherein a membrane of the invention is substantially impermeable.

Organic acids can include formic acid, acetic acid, propionic acid, butyric acid, pentanoic acid, hexanoic acid, heptanoic acid, octanoic acid, nonanoic acid, decanoic acid, and lactic acid and derivatives and mixtures thereof. Also included are phenols and derivatives and mixtures thereof in addition to naturally occurring humic and fulvic acids or biopolymers comprising amino acids, proteins, or complex polysaccharidic acids. The acids can be protonated or deprotonated. In a further aspect, one or more of these types of organic acids are not among the impurities wherein a membrane of the invention is substantially impermeable.

In a further aspect, the impurities can be the product of a chemical or biological reaction, screening assay, or isolation technique. For example, the impurities can be a chemically active agent, a pharmaceutically active agent, or a biologically active agent or a mixture thereof. In a yet further aspect, one or more of these types of agents are not among the impurities wherein a membrane of the invention is substantially impermeable.

2. Nanoparticles

Generally, the nanoparticles of the invention can be any nanoparticles known to those of skill in the art. However, in one aspect, the nanoparticles used in connection with the membranes of the invention can be selected based upon a number of criteria, including one or more of: (1) an average particle size in the nanoscale regime (i.e., having at least one dimension of a size of from about 1 nm to about 1,000 nm, for example, from about 1 nm to about 500 nm, from about 1 nm to about 250 nm, or from about 1 nm to about 100 nm); (2) an average hydrophilicity greater than that of the polymer matrix comprising the membrane, thereby enhancing the passive fouling resistance of the resulting membrane (e.g., a surface film consisting essentially of suitable nanoparticulate material would be completely wetted with a pure water contact angle less than about 5° to 10°); (3) a nanoscale porosity with characteristic pore dimensions of from about 3 Å to about 30 Å; and/or (4) dispersibility in both the polar liquid and the apolar liquid. Optionally, the nanoparticles can be selected so as to be modifiable to impart biocidal or antimicrobial reactivity to the membrane.

a. Particle Composition

In one aspect, the nanoparticles of the invention can be a metallic species. The metallic species can be any metallic species known to those of skill in the art and meeting the nanoparticle selection criteria of the invention. For example, the nanoparticles can comprise at least one of gold, silver, copper, zinc, titanium, iron, aluminum, zirconium, indium, tin, magnesium, or calcium or an alloy thereof or an oxide thereof or a mixture thereof. It is also contemplated that metallic species can be absent from the compositions and/or methods of the invention.

In a further aspect, the nanoparticles can be a nonmetallic species. The nonmetallic species can be any nonmetallic species known to those of skill in the art and meeting the nanoparticle selection criteria of the invention. For example, the nanoparticles can comprise at least one of $Si_3N_4$, SiC, BN, $B_4C$, or TiC or an alloy thereof or a mixture thereof. It is also contemplated that nonmetallic species can be absent from the compositions and/or methods of the invention.

In a further aspect, the nanoparticles can be a carbon-based species. The carbon-based species can be any carbon-based species known to those of skill in the art and meeting the nanoparticle selection criteria of the invention. For example, the nanoparticles can comprise at least one of graphite, carbon glass, a carbon cluster of at least $C_2$, buckminsterfullerene, a higher fullerene, a carbon nanotube, a carbon nanoparticle, or a mixture thereof. Such materials, in nanoparticulate form, can be surface modified to enable compatibility with the non-aqueous solvent as well as to promote hydrophilicity by attaching molecules containing, for example, phenethyl sulfonic acid moieties where the phenethyl group promotes compatibility with the apolar solvent and the acid group promotes compatibility with water. The relative compatibility with aqueous and non-aqueous phases can be tuned by changing the hydrocarbon chain length. It is also contemplated that carbon-based species can be absent from the compositions and/or methods of the invention.

In a further aspect, the nanoparticles can comprise a dendrimer. The dendrimer can be any dendrimer known to those of skill in the art and meeting the nanoparticle selection criteria of the invention. For example, the dendrimer can comprise at least one of primary amino (PAMAM) dendrimers with amino, carboxylate, hydroxyl, succinamic acid, organisilicon or other surface groups, cyclotriphosphazene dendrimers, thiophoshphoryl-PMMH dendrimers with aldehyde surface groups, polypropylenimine dendrimers with amino surface groups, poly(vinyl alcohol)-divinylsulfone, N-isopropyl acrylamide-acrylic acid or a mixture thereof. It is also contemplated that dendrimers can be absent from the compositions and/or methods of the invention.

In a further aspect, the nanoparticles can comprise at least one zeolite. The zeolite can be any zeolite known to those of skill in the art and meeting the nanoparticle selection criteria of the invention. A zeolite can be natural or synthetic. Zeolites can also be referred to as "molecular sieves." It is also contemplated that zeolites or "molecular sieves" can be absent from the compositions and/or methods of the invention.

A zeolite structure can be referred to by a designation consisting of three capital letters used to describe and define the network of the corner sharing tetrahedrally coordinated framework atoms. Such designation follows the rules set up by an IUPAC Commission on Zeolite Nomenclature in 1978. The three letter codes are generally derived from the names of the type materials. Known synthetic zeolites that are considered suitable porous nanoparticulate materials include: ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, CDO, CFI, CGF, CGS, CHA, —CHI, —CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, -LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, —PAR, PAU, PHI, PON, RHO, —RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WEI, —WEN, YUG, and ZON. As well known to those of skill in the art, an up-to-date list of known synthetic zeolites can be accessed at http://topaz.ethz.ch/IZA-SC/StdAtlas.htm. It is also contemplated that zeolites having structures of other than the structures expressly disclosed herein, but otherwise meeting the nanoparticle selection criteria of the invention, can also be employed in connection with the membranes of the invention.

In one aspect, the nanoparticles comprise a porous structure. That is, the pores of the nanoparticle provide an open structure in one dimension or direction. In a further aspect, the nanoparticles can comprise an interconnected porous material. That is, the pores of the nanoparticle can be "linked" to provide an open structure in more than one dimension or direction. An example of a porous material can be found in zeolitic materials. A specific example of an interconnected porous material can be found in Zeolite A. In such an aspect, the nanoparticles can comprise preferential flow paths for liquids permeating the membranes of the invention.

The size of the pores in the nanoparticles can be described in terms of average pore diameter and can be expressed in angstroms (Å). In a further aspect, the nanoparticles can have a nanoscale porosity with characteristic pore dimensions of from about 3 Å to about 30 Å, for example, from about 3 Å to about 10 Å, from about 10 Å to about 20 Å, from about 20 Å to about 30 Å, from about 3 Å to about 20 Å, or from about 10 Å to about 30 Å. In a further aspect, the nanoparticles can have an interconnected pore structure; that is, adjacent pores are linked or coupled to produce a network of channels throughout the nanoparticle structure. In a yet further aspect, the nanoparticles can have a substantially non-interconnected pore structure; for example, the pores can comprise substantially parallel channels extending through the nanoparticles. In further aspects, the nanoparticles can comprise an about 1 Å to an about 50 Å porous material, an about 2 Å to an about 40 Å porous material, an about 3 Å to an about 12 Å porous material, an about 3 Å to an about 30 Å porous material, an about 1 Å to an about 20 Å porous material, an about 2 Å to an about 20 Å porous material, an about 2 Å to an about 40 Å porous material, an about 5 Å to an about 50 Å porous material, or an about 5 Å to an about 20 Å porous material.

Generally, zeolites or molecular sieves are materials with selective sorption properties capable of separating components of a mixture on the basis of a difference in molecular size, charge, and shape. Zeolites can be crystalline aluminosilicates with fully cross-linked, open framework structures made up of corner-sharing $SiO_4$ and $AlO_4$ tetrahedra. A representative empirical formula of a zeolite is $M_{2/n}O \cdot Al_2O_3 \cdot xSiO_2 \cdot yH_2O$ where M represents the exchangeable cation of valence n. M is generally a Group I or II ion, although other metal, non-metal, and organic cations can also balance the negative charge created by the presence of Al in the structure. The framework can contain cages and channels of discrete size, which are normally occupied by water. In addition to $Si^{4+}$ and $Al^{3+}$, other elements can also be present in the zeolitic framework. They need not be isoelectronic with $Si^{4+}$ or $Al^{3+}$, but are able to occupy framework sites. Aluminosilicate zeolites typically display a net negative framework charge, but other molecular sieve frameworks can be electrically neutral.

Zeolites can also include minerals that have similar cage-like framework structures or have similar properties and/or are associated with aluminosilicates. These include the phosphates: kehoeite, pahasapaite and tiptopite; and the silicates: hsianghualite, lovdarite, viseite, partheite, prehnite, roggianite, apophyllite, gyrolite, maricopaite, okenite, tacharanite and tobermorite. Thus, zeolites can also comprise molecular sieves based on $AlPO_4$. These aluminophosphates, silicoaluminophosphates, metalloaluminophosphates and metallosilicoaluminophosphates are denoted as $AlPO_{4-n}$, SAPO-n, MeAPO-n and MeAPSO-n, respectively, where n is an integer indicating the structure type. $AlPO_4$ molecular sieves can have the structure of known zeolites, but many have novel structures. When Si is incorporated in an $AlPO_{4-n}$ framework, the product is known as SAPO. MeAPO or MeAPSO sieves are formed by the incorporation of a metal atom (Me) into an $AlPO_{4-n}$ or SAPO framework. These metal atoms include Li, Be, Mg, Co, Fe, Mn, Zn, B, Ga, Fe, Ge, Ti, and As. Most substituted $AlPO_{4-n}$'s have the same structure as $AlPO_{4-n}$, but several new structures are only found in SAPO, MeAPO and MeAPSO materials. Their frameworks typically carry an electric charge. Thus, zeolite chemistry is not confined to aluminosilicates.

The framework of a molecular sieve typically contains cages and channels of discrete size and generally from about 3 to about 30 Å in diameter. In certain aspects, the primary building unit of a molecular sieve is the individual tetrahedral unit, with topology described in terms of a finite number of specific combinations of tetrahedra called "secondary building units" (SBU's).

In these aspects, description of the framework topology of a molecular sieve can also involve "tertiary" building units corresponding to different arrangements of the SBU's in space. The framework can be considered in terms of large polyhedral building blocks forming characteristic cages. For example, sodalite, Zeolite A, and Zeolite Y can all be generated by the truncated octahedron known as the [[beta]]-cage. An alternative method of describing extended structures uses the two-dimensional sheet building units. Various kinds of chains can also be used as the basis for constructing a molecular sieve framework.

For example, the zeolites can be at least one zeolite from the Analcime Family: Analcime (Hydrated Sodium Aluminum Silicate), Pollucite (Hydrated Cesium Sodium Aluminum Silicate), and Wairakite (Hydrated Calcium Sodium Aluminum Silicate); Bellbergite (Hydrated Potassium Barium Strontium Sodium Aluminum Silicate); Bikitaite (Hydrated Lithium Aluminum Silicate); Boggsite (Hydrated calcium Sodium Aluminum Silicate); Brewsterite (Hydrated Strontium Barium Sodium Calcium Aluminum Silicate); the Chabazite Family: Chabazite (Hydrated Calcium Aluminum Silicate) and Willhendersonite (Hydrated Potassium Calcium Aluminum Silicate); Cowlesite (Hydrated Calcium Aluminum Silicate); Dachiardite (Hydrated calcium Sodium Potassium Aluminum Silicate); Edingtonite (Hydrated Barium Calcium Aluminum Silicate); Epistilbite (Hydrated Calcium Aluminum Silicate); Erionite (Hydrated Sodium Potassium Calcium Aluminum Silicate); Faujasite (Hydrated Sodium Calcium Magnesium Aluminum Silicate); Ferrierite (Hydrated Sodium Potassium Magnesium Calcium Aluminum Silicate); the Gismondine Family: Amicite (Hydrated Potassium Sodium Aluminum Silicate), Garronite (Hydrated Calcium Aluminum Silicate), Gismondine (Hydrated Barium Calcium Aluminum Silicate), and Gobbinsite (Hydrated Sodium Potassium Calcium Aluminum Silicate); Gmelinite (Hydrated Sodium Calcium Aluminum Silicate); Gonnardite (Hydrated Sodium Calcium Aluminum Silicate); Goosecreekite (Hydrated Calcium Aluminum Silicate); the Harmotome Family: Harmotome (Hydrated Barium Potassium Aluminum Silicate), Phillipsite (Hydrated Potassium Sodium Calcium Aluminum Silicate), Wellsite (Hydrated Barium Calcium Potassium Aluminum Silicate); The Heulandite Family: Clinoptilolite (Hydrated Sodium Potassium Calcium Aluminum Silicate) and Heulandite (Hydrated Sodium Calcium Aluminum Silicate); Laumontite (Hydrated Calcium Aluminum Silicate); Levyne (Hydrated Calcium Sodium Potassium Aluminum Silicate); Mazzite (Hydrated Potassium Sodium Magnesium Calcium Aluminum Silicate); Merlinoite (Hydrated Potassium Sodium Calcium Barium Aluminum Silicate); Montesommaite (Hydrated Potassium Sodium Aluminum Silicate); Mordenite (Hydrated Sodium Potassium Calcium Aluminum Silicate); the Natrolite Family: Mesolite (Hydrated Sodium Calcium Aluminum Silicate), Natrolite (Hydrated Sodium Aluminum Silicate), and Scolecite (Hydrated Calcium Aluminum Silicate); Offretite (Hydrated Calcium Potassium Magnesium Aluminum Silicate); Paranatrolite (Hydrated Sodium Aluminum Silicate); Paulingite (Hydrated Potassium Calcium Sodium Barium Aluminum Silicate); Perlialite (Hydrated Potassium Sodium Calcium Strontium Aluminum Silicate); the Stilbite Family: Barrerite (Hydrated Sodium Potassium Calcium Aluminum Silicate), Stilbite (Hydrated Sodium Calcium Aluminum Silicate), and Stellerite (Hydrated Calcium Aluminum Silicate); Thomsonite (Hydrated Sodium Calcium Aluminum Silicate); Tschernichite (Hydrated Calcium Aluminum Silicate); Yugawaralite (Hydrated Calcium Aluminum Silicate) or a mixture thereof.

In one aspect, the nanoparticles can comprise Zeolite A. In a further aspect, the nanoparticles can comprise one or more of Zeolite A (also referred to as Linde Type A or LTA), MFI, FAU, or CLO or a mixture thereof.

In a further aspect, the zeolite comprises a negatively charged functionality. That is, in one aspect, the zeolite can have negatively charged species within the crystalline framework, while the framework maintains an overall net neutral charge. In a further aspect, the zeolite can have a net charge on the crystalline framework. One example wherein the zeolite comprises a negatively charged functionality is Zeolite A. In such an aspect, the negatively charged functionality can bind cations, including for example silver ions. Thus, the zeolite nanoparticles can be subject to ion-exchange with silver ions. The nanocomposite membranes can thereby acquire antimicrobial properties. A. M. P. McDonnell et al., Hydrophilic and antimicrobial zeolite coatings for gravity-independent water separation, *Adv. Functional Mater.* 15 (2005) 336.

b. Particle Size

Particle size for nanoparticles is often described in terms of average hydrodynamic diameter, assuming a substantially spherical shape of the particles. While it is contemplated that the nanoparticles of the invention can be provided in any particle size known to those of skill in the art, the nanoparticles of the invention are, in one aspect, with an average hydrodynamic diameter of from about 1 nm to about 1000 nm, from about 10 nm to about 1000 nm, from about 20 nm to about 1000 nm, from about 50 nm to about 1000 nm, from about 1 nm to about 500 nm, from about 10 nm to about 500 nm, from about 50 nm to about 200 nm, from about 200 nm to about 300 nm, or from about 50 nm to about 500 nm.

In a further aspect, the particle size of the nanoparticles can be selected to match the thickness of the film layer. For example, for a film thickness of from about 200 nm to about 300 nm, the nanoparticles of the invention can be selected to have an average hydrodynamic diameter of from about 200 nm to about 300 nm. As another example, for a film thickness of from about 50 nm to about 200 nm, the nanoparticles of the invention can be selected to have an average hydrodynamic diameter of from about 50 nm to about 200 nm.

3. Hydrophilic Layer

In one aspect, the membranes of the invention can comprise a film having a face, wherein the film comprises a polymer matrix, and can further comprise a hydrophilic layer proximate to the face. In a further aspect, the hydrophilic layer can be adjacent to the face. In a yet further aspect, the hydrophilic layer can be in contact with the face.

While it is contemplated that the hydrophilic layer can comprise any hydrophilic material known to those of skill in the art, the layer, in one aspect, comprises a water-soluble polymer. In a further aspect, the hydrophilic layer can comprise at least one of polyvinyl alcohol, polyvinyl pyrrole, polyvinyl pyrrolidone, hydroxypropyl cellulose, polyethylene glycol, saponified polyethylene-vinyl acetate copolymer, triethylene glycol, or diethylene glycol or a mixture thereof.

It is contemplated that the hydrophilic layer can comprise a crosslinked hydrophilic polymeric material. In a further aspect, the hydrophilic layer can comprise a non-crosslinked hydrophilic polymeric material. In one aspect, the hydrophilic layer comprises crosslinked polyvinyl alcohol. It is also understood that the hydrophilic layer can further comprise the nanoparticles of the invention disposed within the layer. In a further aspect, the nanoparticles can be substantially encapsulated within the hydrophilic layer. For example, the film can comprise a cross-linked polymer, and the nanoparticles can be substantially encapsulated within the polymer.

4. Film

In one aspect, the membranes of the invention can comprise a film comprising a polymer matrix, wherein the film is substantially permeable to water and substantially impermeable to impurities. By "polymer matrix" it is meant that the polymeric material can comprise a three-dimensional polymer network. For example, the polymer network can be a crosslinked polymer formed from reaction of at least one polyfunctional monomer with a difunctional or polyfunctional monomer.

In one aspect, the nanoparticles of the invention are disposed within the polymer matrix. By disposed "within the polymer matrix," it is meant that the nanoparticles are mechanically entrapped within the strands of the three-dimensional polymer network. For example, the polymer matrix can be crosslinked around the nanoparticles. Such mechanical entrapment can occur during, for example, interfacial polymerization, wherein the nanoparticles are present during the polymerization reaction. Another example of such mechanical entrapment is wherein the nanoparticles are added to a non-crosslinked polymeric material after the polymerization reaction has occurred, but a subsequent crosslinking reaction is performed while the nanoparticles are present. It is understood that the invention can include both of the foregoing examples or can be limited to one of the foregoing examples, as desired.

In one aspect, when nanoparticles are disposed "within the polymer matrix," at least about 50% of the volume of at least about 50% the nanoparticles is mechanically entrapped within the strands of the three-dimensional polymer network. For example, at least about 60%, at least about 70%, at least about 80%, or at least about 90% of the volume of at least about 50% the nanoparticles can be mechanically entrapped within the strands of the three-dimensional polymer network. As another example, at least about 50% of the volume of at least about 60%, at least about 70%, at least about 80%, or at least about 90% of the nanoparticles can be mechanically entrapped within the strands of the three-dimensional polymer network.

Such examples are in contrast to a condition wherein a particle is merely physically located within a polymeric material. A particle being merely physically located within a polymeric material can occur, for example, when a particle is physically mixed with a bulk polymeric material after the polymerization reaction has occurred.

One example wherein mechanical entrapment of particles within the polymer matrix is typically absent from a film is a procedure wherein particles are positioned within a polymer by a solution casting method, with or without a "compatiblizing" or "priming" step. For example, in a solution casting method disclosed in U.S. Pat. No. 6,585,802 to Koros et al., particles are "primed" (or "sized") by adding a small amount of the desired matrix polymer or any suitable "sizing agent" that will be miscible with the organic polymer to be used for the matrix phase, thereby making the particles more compatible with the polymer film. In such a technique, the particles are typically positioned within the polymer subsequent to any polymerization step and/or a crosslinking step is absent from the technique. In such techniques, the particles are not mechanically entrapped within the strands of a three-dimensional polymer network. Accordingly, in such a technique, the particles are not disposed "within the polymer matrix." It is understood that such an example can, in one aspect, be excluded from the invention.

In a further aspect, the nanoparticles can be "substantially encapsulated within the polymer matrix." By "substantially encapsulated within the polymer matrix," it is meant that at least about 80% of the volume of at least about 50% the nanoparticles can be mechanically entrapped within the strands of the three-dimensional polymer network. For example, at least about 80% or at least about 90% of the volume of at least about 50% the nanoparticles can be mechanically entrapped within the strands of the three-dimensional polymer network.

In a further aspect, the film has a face and at least a portion of the nanoparticles penetrate the face. That is, all or less than all of the nanoparticles penetrates the face. By "penetrate," it is meant that a portion of each nanoparticle is positioned exterior to the surface of the film.

a. Polymer Composition

While it is contemplated that the polymer matrix can comprise any three-dimensional polymer network known to those of skill in the art, in one aspect, the film comprises at least one of an aliphatic or aromatic polyamide, aromatic polyhydrazide, poly-bensimidazolone, polyepiamine/amide, polyepiamine/urea, poly-ethyleneimine/urea, sulfonated polyfurane, polybenzimidazole, polypiperazine isophtalamide, a polyether, a polyether-urea, a polyester, or a polyimide or a copolymer thereof or a mixture thereof. Typically, the polymer is selected to be a polymer that can be formed by an interfacial polymerization reaction or a polymer that can be crosslinked subsequent to polymerization.

In a further aspect, the film comprises a polyamide. The polyamide can be an aromatic polyamide or a non-aromatic polyamide. For example, the polyamide can comprise residues of a phthaloyl (e.g., isophthaloyl or terephthaloyl) halide, a trimesyl halide, or a mixture thereof. In another example, the polyamide can comprise residues of diaminobenzene, triaminobenzene, polyetherimine, piperazine or poly-piperazine or a mixture thereof. In a further aspect, the film comprises residues of a trimesoyl halide and residues of a diaminobenzene. In a further aspect, the film comprises residues of trimesoyl chloride and m-phenylenediamine. In a further aspect, the film comprises the reaction product of trimesoyl chloride and m-phenylenediamine.

b. Film Thickness

While the polymer film can be provided at any desired film thickness, the films of the invention are, in one aspect, provided at a thickness of from about 1 nm to about 1000 nm. For example, the film can be provided at a thickness of from about 10 nm to about 1000 nm, from about 100 nm to about 1000 nm, from about 1 nm to about 500 nm, from about 10 nm to about 500 nm, from about 50 nm to about 500 nm, from about 50 nm to about 200 nm, from about 50 nm to about 250 nm, from about 50 nm to about 300 nm, or from about 200 nm to about 300 nm.

In a further aspect, the thickness of the film layer can be selected to match the particle size of the nanoparticles. For example, for nanoparticles having an average hydrodynamic diameter of from about 200 nm to about 300 nm, the film thickness can be selected to have a film thickness of from about 200 nm to about 300 nm. As another example, for nanoparticles having an average hydrodynamic diameter of from about 50 nm to about 200 nm, the film thickness can be selected to have a film thickness of from about 50 nm to about 200 nm. As another example, for nanoparticles having an average hydrodynamic diameter of from about 1 nm to about 100 nm, the film thickness can be selected to have a film thickness of from about 1 nm to about 100 nm.

The film thickness can be visually confirmed and quantified, for example, by using transmission electron microscopy (TEM). Freger V, Gilron J, Belfer S, "TFC polyamide membranes modified by grafting of hydrophilic polymers: an FT-IR/AFM/TEM study," *Journal of Membrane Science* 209 (2002) 283-292. For TEM observations, the polyester backing of both TFC and TFN membranes was peeled off so that polysulfone and polyamide layers remained together. Small pieces of the two membrane layers were embedded in epoxy resin (e.g., Eponate 12, Ted Pella, Inc.). Approximately 60-80 nm thick sections were cut on a Reichert-Jung Ultracut E ultramicrotome and placed on FORMVAR® (i.e., poly-vinylformal)-coated copper grids. The sections either unstained or stained with 8% uranyl acetate for 30 min were examined on a JEOL 100CX transmission electron microscope (TEM) at an accelerating voltage of 80 kV.

5. Properties

In various aspects, the nanocomposite membranes of the invention can have various properties that provide the superior function of the membranes, including excellent flux, high hydrophilicity, negative zeta potential, surface smoothness, an excellent rejection rate, improved resistance to fouling, and the ability to be provided in various shapes. It is also understood that the membranes have other properties.

a. Flux

The pure water flux of the membranes can be measured in a laboratory scale cross-flow membrane filtration apparatus. For example, the pure water flux can be measured in a high-pressure chemical resistant stirred cell (Sterlitech HP4750 Stirred Cell). In one aspect, the membranes can have a flux of from about 0.02 to about 0.4 GFD (gallons per square foot of membrane per day) per psi (pound per square inch) of applied pressure. For example, the flux can be from about 0.03 to about 0.1, from about 0.1 to about 0.3, from about 0.1 to about 0.2, from about 0.2 to about 0.4, from about 0.05 to about 0.1, from about 0.05 to about 0.2, from about 0.03 to about 0.2, from about 0.5 to about 0.4, from about 0.1 to about 0.4, from about 0.03 to about 0.3 gallons per square foot of membrane per day per psi of applied pressure.

b. Hydrophilicity

The hydrophilicity of the membranes can be expressed in terms of the pure water equilibrium contact angle. The contact angles of the membranes of the invention can be measured using a contact angle goniometer (DSA10, KRUSS GmbH). In one aspect, a membrane of the invention can have a pure water equilibrium contact angle of less than about 90°. For example, the contact angle can be less than about 75°, less than about 60°, less than about 45°, or less than about 30°. In a further aspect, the contact angle can be from about 60° to about 90°, from about 50° to about 80°, from about 40° to about 70°, from about 30° to about 60°, from about 20° to about 50°, or below 20°.

c. Zeta Potential

The surface (zeta) potential of the membranes of the invention can be measured by streaming potential analysis (BI-EKA, Brookhaven Instrument Corp). In one aspect, a membrane of the invention can have a zeta potential of from about +10 to about −50 mV depending on solution pH, type of counter-ions present, and total solution ionic strength. For example, in 10 mM NaCl solution the zeta potential can be at least as negative as about −5 mV, at least as negative as about −15 mV, at least as negative as about −30 mV, or at least as negative as about −45 mV for pHs range of from about 4 to about 10.

d. Roughness

The surface topography of the synthesized membranes can be investigated by atomic force microscopy (AFM). Such investigation allows calculation of a root mean squared (RMS) roughness value for a membrane surface. Hoek, E. M. V., S. Bhattacharjee, and M. Elimelech, "Effect of Surface Roughness on Colloid-Membrane DLVO Interactions," *Langmuir* 19 (2003) 4836-4847. In one aspect, a membrane of the invention can have an RMS surface roughness of less than about 100 nm. For example, the RMS surface roughness can be less than about 65 nm, less than about 60 nm, less than about 55 nm, less than about 50 nm, less than about 45 nm, or less than about 40 nm.

e. Rejection

Salt water rejection of the membranes of the invention can be measured in the same high-pressure chemical resistant stirred cell used to measure flux, for example, using approximately 2,000 ppm NaCl. The salt concentrations in the feed and permeate water can then be measured by a digital conductivity meter and the rejection is defined as $R=1-c_p/c_f$, where $c_p$ is the salt concentration in the permeated solution and $c_f$ is the salt concentration in the feed solution. In one aspect, a membrane of the invention can have a salt water rejection of from about 75 to greater than about 95 percent.

f. Resistance to Fouling

The relative biofouling potentials of the membranes of the invention can be evaluated by direct microscopic observation of microbial deposition and adhesion. S. Kang, A. Subramani, E. M. V. Hoek, M. R. Matsumoto, and M. A. Deshusses, Direct observation of biofouling in cross-flow microfiltration: mechanisms of deposition and release, *Journal of Membrane Science* 244 (2004) 151-165. Viability of bacteria adhered to Zeolite A-polyamide (ZA-PA) and polyamide (PA) membranes can be verified with a commercial viability staining kit (e.g., LIVE/DEAD® BacLight™ Bacterial Viability Kit, Molecular Probes, Inc., Eugene Oreg.) for 2-4 minutes, followed by observation using a fluorescence microscope (e.g., BX51, Olympus America, Inc., Melville, N.Y.). Living cells can be observed as green spots and dead (inactivated) cells are seen as red spots. B. K. Li and B. E. Logan, The impact of ultraviolet light on bacterial adhesion to glass and metal oxide-coated surface, *Colloids and Surfaces B-Biointerfaces* 41 (2005) 153-161.

g. Shape

A variety of membrane shapes are useful and can be provided using the present invention. These include spiral wound, hollow fiber, tubular, or flat sheet type membranes.

D. PREPARATION OF NANOCOMPOSITE MEMBRANES

In one aspect, the membranes of the invention are prepared by a method distinct from the conventional RO membrane preparation processes. However, many of the techniques used in conventional RO membrane preparation can be applicable to the methods of the invention.

1. Thin Film Composite Membrane Formation Techniques

Thin film composite membranes can be formed on the surface of a microporous support membrane via interfacial polymerization. See U.S. Pat. No. 6,562,266. One suitable microporous support for the composite membrane is a polysulfone "ultrafiltration" membrane with molecular cut-off value of ~60 kDa and water permeability of ~100-150 l/m$^2$·h·bar. Zhang, W., G. H. He, P. Gao, and G. H. Chen, Development and characterization of composite nanofiltration membranes and their application in concentration of antibiotics, *Separation and Purification Technology*, 30 (2003) 27; Rao, A. P., S. V. Joshi, J. J. Trivedi, C. V. Devmurari, and V. J. Shah, Structure-performance correlation of polyamide thin film composite membranes: Effect of coating conditions on film formation, *Journal of Membrane Science*, 211 (2003) 13. The support membrane can be immersed in an aqueous solution containing a first reactant (e.g., 1,3-diaminobenzene or "MPD" monomer). The substrate can then be put in contact with an organic solution containing a second reactant (e.g., trimesoyl chloride or "TMC" initiator). Typically, the organic or apolar liquid is immiscible with the polar or aqueous liquid, so that the reaction occurs at the interface between the two solutions to form a dense polymer layer on the support membrane surface.

The standard conditions for the reaction of MPD and TMC to form a fully aromatic, polyamide thin film composite membrane include an MPD to TMC concentration ratio of ~20 with MPD at about 1 to 3 percent by weight in the polar phase. The reaction can be carried out at room temperature in an open environment, but the temperature of either the polar or the apolar liquid or both can be controlled. Once formed, the dense polymer layer can act as a barrier to inhibit the contact between reactants and to slow down the reaction; hence, the selective dense layer so formed is typically very thin and permeable to water, but relatively impermeable to dissolved, dispersed, or suspended solids. This type of membrane is conventionally described as a reverse osmosis (RO) membrane.

2. Nanofiltration Membrane Formation Techniques

Unlike conventional RO membranes, nanofiltration (NF) membranes typically have the ability to selectively separate divalent and monovalent ions. A nanofiltration membrane exhibits a preferential removal of divalents over monovalents, while a conventional reverse osmosis membrane typically does not exhibit significant selectivity. A conventional thin film composite nanofiltration (NF) membrane can be made as follows. Piperazine, together with a hydrophilic monomer or polymer containing amine groups (e.g., tri- ethylamine or "TEA" catalyst), is dissolved in water. The microporous support membrane can then be immersed in the aqueous solution with a piperazine concentration of ~1-2 wt % at room temperature for a desired amount of time. Next, the membrane is put in contact with the organic solution containing ~0.1-1 wt % of TMC at room temperature for about a minute after the excess solution on the membrane surface is removed. Other changes to water flux and solute rejection can be accomplished by using different monomers and initiators, changing the structure of the microporous support membrane, altering the ratio of monomer to initiator in the reaction solutions, blending multiple monomers and initiators, changing structure of the organic solvent or using blends of different organic solvents, controlling reaction temperature and time, or adding catalysts (e.g., metals, acids, bases, or chelators). In general, polyfunctional amines are dissolved in water and polyfunctional acid chlorides are dissolved in a suitable nonpolar solvent, which is immiscible with water like, for example, hexane, heptane, naptha, cyclohexane, or isoparaffin based hydrocarbon oil. While not wishing to be bound by theory, it is believed that the interfacial polycondensation reaction does not take place in the water phase, because a highly unfavorable partition coefficient for acid chloride limits its availability in the aqueous phase. For film thickness to build up, the amine monomer crosses the water-organic solvent interface, diffuses through the polyamide layer already formed, and then comes into contact with acid chloride on the organic solvent side of the polyamide layer. Thus, new polymer forms on the organic solvent side of the polyamide film. While not wishing to be bound by theory, it is believed that the thickness of the thin film formed at the interface is primarily determined by the rate of diffusion of the amine to the organic phase via water-organic media interface. See, e.g., Rao, A. P., S. V. Joshi, J. J. Trivedi, C. V. Devmurari, and V. J. Shah, Structure-performance correlation of polyamide thin film composite membranes: Effect of coating conditions on film formation, *Journal of Membrane Science*, 211 (2003) 13; Kwak, S. Y., S. G. Jung, and S. H. Kim, Structure-motion-performance relationship of flux-enhanced reverse osmosis (RO) membranes composed of aromatic polyamide thin films, *Environmental Science & Technology*, 35 (2001) 4334; Kwak, S. Y., Relationship of relaxation property to reverse osmosis permeability in aromatic polyamide thin-film-composite membranes, *Polymer*, 40 (1999) 6361; Kwak, S. Y. and D. W. Ihm, Use of atomic force microscopy and solid-state NMR spectroscopy to characterize structure-property-performance correlation in high-flux reverse osmosis (RO) membranes, *Journal of Membrane Science*, 158 (1999) 143; U.S. Pat. No. 5,028,337; Mulder, M., *Basic principles of membrane technology, Second*, Kluwer Academic Publishers, Dordrecht, N L, 1996; Petersen, R. J., Composite reverse-osmosis and nanofiltration membranes, *Journal of Membrane Science*, 83 (1993) 81; Kurihara, M., Y. Fusaoka, T. Sasaki, R. Bairinji, and T. Uemura, Development of cross-linked fully aromatic polyamide ultra-thin composite membranes for seawater desalination, *Desalination*, 96 (1994) 133; Kim, C. K., J. H. Kim, I. J. Roh, and J. J. Kim, The changes of membrane performance with polyamide molecular structure in the reverse osmosis process, *Journal of Membrane Science*, 165 (2000) 189; Hoek, E. M. V., Colloidal fouling mechanisms in reverse osmosis and nanofiltration, Ph.D., Chem. Eng., Yale University, New Haven, Conn., 2002; U.S. Pat. No. 6,413,425; Comstock, D. L., Desal-5 membrane for water softening, *Desalination*, 76 (1989) 61; Cadotte, J. E., R. J. Petersen, R. E. Larson, and E. E. Erickson, New thin-film composite seawater reverse-osmosis membrane, *Desalination,* 32 (1980) 25; Cadotte, J., R. Forester, M. Kim, R. Petersen, and T. Stocker, Nanofiltration membranes broaden the use of membrane separation technology, *Desalination,* 70 (1988) 77; Belfer, S., Y. Purinson, and O. Kedem, Surface modification of commercial polyamide reverse osmosis membranes by radical grafting: An ATR-FTIR study, *Acta Polymerica,* 49 (1998) 574; Belfer, S., Y. Purinson, R. Fainshtein, Y. Radchenko, and O. Kedem, Surface modification of commercial composite polyamide reverse osmosis membranes, *Journal of Membrane Science,* 139 (1998) 175; Belfer, S., J. Gilron, Y. Purinson, R. Fainshtain, N. Daltrophe, M. Priel, B. Tenzer, and A. Toma, Effect of surface modification in preventing fouling of commercial SWRO membranes at the Eilat seawater desalination pilot plant, *Desalination,* 139 (2001) 169.

3. Post-Treatment Techniques

Various post-treatments can be employed to enhance water permeability, solute rejection, or fouling resistance of a formed TFC membrane. See, e.g., U.S. Pat. No. 5,755,964. For example, a membrane can be immersed in an acidic and/or basic solution to remove residual, unreacted acid chlorides and diamines. While not wishing to be bound by theory, it is believed that such treatments can improve the flux of the formed composite membrane. Additionally, heat treatment, or curing, can also be applied to promote contact between the polyamide film and polysulfone support (e.g., at low temperature) or to promote cross-linking within the formed polyamide film. Generally, curing increases solute rejection, but often at the cost of lower water permeability. Finally, a membrane can be exposed to an oxidant such as chlorine by filtering a 10-20 ppm solution of, for example, sodium hypochlorite through the membrane for 30-60 minutes. Post-chlorination of a fully aromatic polyamide thin film composites forms chloramines as free chlorine reacts with pendant amine functional groups within the polyamide film. This can increase the negative charge density, by neutralizing positively-charged pendant amine groups, and the result is a more hydrophilic, negatively charged RO membrane with higher flux, salt rejection, and fouling resistance.

Membrane surface properties, such as hydrophilicity, charge, and roughness, typically correlate with RO/NF membrane fouling. Zhu, X. H. and M. Elimelech, Colloidal fouling of reverse osmosis membranes: Measurements and fouling mechanisms, *Environmental Science & Technology,* 31 (1997) 3654; Vrijenhoek, E. M., S. Hong, and M. Elimelech, Influence of membrane surface properties on initial rate of colloidal fouling of reverse osmosis and nanofiltration membranes, *Journal of Membrane Science,* 188 (2001) 115; Elimelech, M., X. Zhu, A. E. Childress, and S. Hong, Role of membrane surface morphology in colloidal fouling of cellulose acetate and composite aromatic polyamide reverse osmosis membranes, *Journal of Membrane Science,* 127 (1997) 101; Brant, J. A. and A. E. Childress, Assessing short-range membrane-colloid interactions using surface energetics, *Journal of Membrane Science,* 203 (2002) 257; Flemming, H. C., Mechanistic aspects of reverse osmosis membrane biofouling and prevention, in Z. Amjad (Ed.), *Membrane technology,* Van Nostrand Reinhold, New York, 1992, pp. 163; Flemming, H. C., G. Schaule, T. Griebe, J. Schmitt, and A. Tamachkiarowa, Biofouling—the achilles heel of membrane processes, *Desalination,* 113 (1997) 215. Generally, membranes with highly hydrophilic, negatively charged, and smooth surfaces yield good permeability, rejection, and fouling behavior. However, important surface attributes of RO and NF membranes—to promote fouling resistance—include hydrophilicity and smoothness. Membrane surface charge can also be a factor when solution ionic strength is significantly less than 100 mM because at or above this ionic strength electrical double layer interactions are negligible. Israelachvili, J. N., *Intermolecular and surface forces,* 2nd Ed., Academic Press, London, 1992; Probstein, R. F., *Physicochemical hydrodynamics,* 2nd, John Wiley & Sons, Inc., New York, N.Y., 1994; Stumm, W. and J. J. Morgan, *Aquatic chemistry,* 1st, Wiley-Interscience, New York, N.Y., 1996. Since many RO and NF applications involve highly saline waters, one cannot always rely on electrostatic interactions to inhibit foulant deposition. Moreover, it has been demonstrated that polyamide composite membrane fouling by natural organic matter (NOM) is typically mediated by calcium complexation reactions occurring between carboxylic acid functional groups of the NOM macromolecules and pendant carboxylic acid functional groups on the membrane surface. Li, Q. L. and M. Elimelech, Organic fouling and chemical cleaning of nanofiltration membranes: Measurements and mechanisms, *Environmental Science & Technology,* 38 (2004) 4683; Hong, S. K. and M. Elimelech, Chemical and physical aspects of natural organic matter (nom) fouling of nanofiltration membranes, *Journal of Membrane Science,* 132 (1997) 159.

4. Hydrophilic Layer Formation Techniques

Creation of a non-reactive, hydrophilic, smooth composite membrane surface typically includes applying an additional coating layer comprised of a water-soluble (superhydrophilic) polymer such as polyvinyl alcohol (PVA), polyvinyl pyrrole (PVP), or polyethylene glycol (PEG) on the surface of a polyamide composite RO membrane. In recent years, several methods of composite membrane surface modification have been introduced in membrane preparation beyond simple dip-coating and interfacial polymerization methods of the past. These advanced methods include plasma, photochemical, and redox initiated graft polymerization, drying-leaching (two-step), electrostatically self-assembled multi-layers, Gilron J, Belfer S, Vaisanen P, Nystrom M, Effects of surface modification on antifouling and performance properties of reverse osmosis membranes, *Desalination* 140 (2001) 167-179; Hammond P. T., Recent explorations in electrostatic multilayer thin film assembly, *Current Opinion in Colloid & Interface Science* 4 (1999) 430-442; Gilron, J; Belfer, S; Vaisanen, P; et al. Effects of surface modification on antifouling and performance properties of reverse osmosis membranes, *Desalination,* 140 (2001) 167-179. Ma, H M; Nielsen, D R; Bowman, C N; et al. Membrane surface modification and backpulsing for wastewater treatment, *Separation Science and Technology,* 36 (2001) 1557-1573. Ma, H M; Bowman, C N; Davis, R H, Membrane fouling reduction by backpulsing and surface modification, *Journal of Membrane Science,* 173 (2000) 191-200. Chiang W. Y. and Hu C. M., Separation of liquid-mixtures by using polymer membranes: 1. Water alcohol separation by pervaporation through PVA-g-MMA MA membrane, *Journal of Applied Polymer Science* 43 (1991) 2005-2012. Advantages of these surface modification approaches include well-controlled coating layer thickness, permeability, charge, functionality, smoothness, and hydrophilicity. However, a drawback of all of these sophisticated surface modification methods is the inability to economically incorporate them into existing commercial manufacturing systems.

Currently, one preferred approach to surface modification of thin film composite membranes remains the simple dip coating-drying approach. In addition, polyvinyl alcohol can be an attractive option for modification of composite membranes because of its high water solubility and good film-forming properties. It is known that polyvinyl alcohol is little affected by grease, hydrocarbons, and animal or vegetable oils; it has outstanding physical and chemical stability against organic solvents. Thus, polyvinyl alcohol can be used as a protective skin layer in the formation of thin-film composite membranes for many reverse osmosis applications, as well as an ultra-thin selective layer in many pervaporation applications. K. Lang, S. Sourirajan, T. Matsuura, G. Chowdhury, A study on the preparation of polyvinyl alcohol thin-film composite membranes and reverse osmosis testing, *Desalination* 104 (1996) 185-196. Kim I C, Ka Y H, Park J Y, Lee K H, Preparation of fouling resistant nanofiltration and reverse osmosis membranes and their use for dyeing wastewater effluent, *Journal of Industrial and Engineering Chemistry* 10 (2004) 115-121.

A PVA coating layer can be formed on the surface of a polyamide composite membrane as follows. An aqueous PVA solution with ~0.1-1 wt % PVA with molecular weight ranging from 2,000 to over 70,000 can be prepared by dissolving the polymer in distilled/deionized water. Lang, K., T. Matsuura, G. Chowdhury, and S. Sourirajan, Preparation and testing of polyvinyl-alcohol composite membranes for reverse-osmosis, *Canadian Journal of Chemical Engineering*, 73 (1995) 686; Lang, K., G. Chowdhury, T. Matsuura, and S. Sourirajan, Reverse-osmosis performance of modified polyvinyl-alcohol thin-film composite membranes, *Journal of Colloid and Interface Science*, 166 (1994) 239; Lang, K., S. Sourirajan, T. Matsuura, and G. Chowdhury, A study on the preparation of polyvinyl alcohol thin-film composite membranes and reverse osmosis testing, *Desalination*, 104 (1996) 185. PVA powder is easily dissolved in water by stirring at ~90° C. for ~5 hours. The already formed polyamide composite membrane is contacted with the PVA solution and the deposited film is dried overnight. Subsequently, the membrane can be brought into contact (e.g., from the PVA side) with a solution containing a cross-linking agent (e.g., dialdehydes and dibasic acids) and catalyst (e.g., ~2.4 wt % acetic acid) for about 1 second. The membrane may then be heated in an oven at a predetermined temperature for a predetermined period. Various cross-linking agents (glutaraldehyde, PVA-glutaraldehyde mixture, paraformaldehyde, formaldehyde, glyoxal) and additives in the PVA solution (formaldehyde, ethyl alcohol, tetrahydrofuran, manganese chloride, and cyclohexane) can be used to prepare PVA films cast over existing membranes in combination with heat treatment of prepared PVA films to modify film properties. Lang, K., S. Sourirajan, T. Matsuura, and G. Chowdhury, A study on the preparation of polyvinyl alcohol thin-film composite membranes and reverse osmosis testing, *Desalination*, 104 (1996) 185.

5. Nanocomposite Membrane Formation

In one aspect, the invention relates to a method for preparing a nanocomposite membrane comprising the steps of providing a polar mixture comprising a polar liquid and a first monomer that is miscible with the polar liquid; providing an apolar mixture comprising an apolar liquid substantially immiscible with the polar liquid and a second monomer that is miscible with the apolar liquid; providing nanoparticles in either the polar mixture or the apolar mixture, wherein the nanoparticles are miscible with the apolar liquid and miscible with the polar liquid; and contacting the polar mixture and the apolar mixture at a temperature sufficient to react the first monomer with the second monomer, thereby interfacially-polymerizing the first monomer and the second monomer to form a polymer matrix, wherein the nanoparticles are disposed within the polymer matrix.

By "miscible," it is meant that the respective phases can mix and form a homogeneous mixture or dispersion at the relevant temperature and pressure. Unless otherwise specified, the relevant temperature and pressure are at room temperature and at atmospheric pressure. Particles can be termed miscible in a liquid if the particles can form a uniform and stable dispersion in the liquid. An example of a particle being miscible in an apolar liquid is Zeolite A nanoparticles in hexane. A further example of a particle being miscible in a polar liquid is Zeolite A nanoparticles in water. By "immiscible," it is meant that the respective phases do not appreciably mix and do not appreciably form a homogeneous mixture at the relevant temperature and pressure. Two liquids can be termed immiscible if neither liquid is appreciably soluble in the other liquid. An example of two immiscible liquids is hexane and water.

a. Apolar Liquid

While it is contemplated that the apolar liquid can be any apolar liquid known to those of skill in the art, typically, an apolar liquid of the invention is selected such that it is immiscible with a particular polar liquid used in a method of the invention. Further, an apolar liquid of the invention is typically selected such that it is miscible with particular nanoparticles of the invention. For example, if the particular polar liquid is water and the particular nanoparticles are Zeolite A, the apolar liquid can be selected to be hexane.

In one aspect, the apolar liquid can comprise at least one of a $C_5$ to $C_{24}$ hydrocarbon. The hydrocarbon can be an alkane, an alkene, or an alkyne. The hydrocarbon can be cyclic or acyclic. The hydrocarbon can be straight chain or branched. The hydrocarbon can be substituted or unsubstituted. In further aspects, the apolar liquid can comprise at least one of a linear hydrocarbon, a branched hydrocarbon, a cyclic hydrocarbon, naptha, heavy naptha, paraffin, or isoparaffin or a mixture thereof. In one aspect, the apolar liquid comprises hexane.

It is understood that the nanoparticles of the invention can, in one aspect, be provided as part of the apolar mixture. For example, the nanoparticles can be dispersed within the apolar liquid.

b. Polar Liquid

While it is contemplated that the polar liquid can be any polar liquid known to those of skill in the art, typically, a polar liquid of the invention is selected such that it is immiscible with a particular apolar liquid used in a method of the invention. Further, a polar liquid of the invention is typically selected such that it is miscible with particular nanoparticles of the invention. For example, if the particular apolar liquid is hexane and the particular nanoparticles are Zeolite A, the polar liquid can be selected to be water.

In one aspect, the polar liquid can comprise at least one of a $C_5$ to $C_{24}$ alcohol. The alcohol can be an alkane, an alkene, or an alkyne. The alcohol can be cyclic or acyclic. The alcohol can be straight chain or branched. The alcohol can be substituted or unsubstituted. In a further aspect, the polar liquid comprises water.

It is understood that the nanoparticles of the invention can, in one aspect, be provided as part of the polar mixture. For example, the nanoparticles can be dispersed within the polar liquid.

In one aspect, the polar mixture can be adsorbed upon a substantially insoluble support membrane prior to the contacting step. The support membrane can comprise, for example, a polysulfone or polyethersulfone webbing.

c. Monomers

Generally, the polymer matrix of the invention is prepared by reaction of two or more monomers. In one aspect, the first monomer is a dinucleophilic or a polynucleophilic monomer and the second monomer is a dielectrophilic or a polyelectrophilic monomer. That is, each monomer can have two or more reactive (e.g., nucleophilic or electrophilic) groups. Both nucleophiles and electrophiles are well known in the art, and one of skill in the art can select suitable monomers for use in the methods of the invention. In one aspect, the first and second monomers can be chosen so as to be capable of undergoing an interfacial polymerization reaction to form a polymer matrix (i.e., a three-dimensional polymer network) when brought into contact. In a further aspect, the first and second monomers can be chosen so as to be capable of undergoing a polymerization reaction when brought into contact to form a polymer product that is capable of subsequent crosslinking by, for example, exposure to heat, light radiation, or a chemical crosslinking agent.

In one aspect, a first monomer is selected so as to be miscible with a polar liquid and, with the polar liquid, can form a polar mixture. The first monomer can optionally also be selected so as to be immiscible with an apolar liquid. Typically, the first monomer is a dinucleophilic or a polynucleophilic monomer. In a further aspect, the first monomer can comprise a diaminobenzene. For example, the first monomer can comprise m-phenylenediamine. As a further example, the first monomer can comprise a triaminobenzene. In a yet further aspect, the polar liquid and the first monomer can be the same compound; that is, the first monomer is not dissolved in a separate polar liquid.

In one aspect, a second monomer is selected so as to be miscible with an apolar liquid and, with the apolar liquid, can form an apolar mixture. The second monomer can optionally also be selected so as to be immiscible with a polar liquid. Typically, the second monomer is a dielectrophilic or a polyelectrophilic monomer. In a further aspect, the second monomer can comprise a trimesoyl halide. For example, the second monomer can comprise trimesoyl chloride. As a further example, the second monomer can comprise a phthaloyl halide. In a yet further aspect, the apolar liquid and the second monomer can be the same compound; that is, the second monomer is not dissolved in a separate apolar liquid.

Generally, the difunctional or polyfunctional nucleophilic monomer used in the present invention can have primary or secondary amino groups and may be aromatic (e.g., m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris(2-diaminoethyl)amine). Examples of suitable amine species include primary aromatic amines having two or three amino groups, for example m-phenylene diamine, and secondary aliphatic amines having two amino groups, for example piperazine. The amine can typically be applied to the microporous support as a solution in a polar liquid, for example water. The resulting polar mixture typically includes from about 0.1 to about 20 weight percent, for example from about 0.5 to about 6 weight percent, amine. Once coated on the microporous support, excess polar mixture may be optionally removed. The polar mixture need not be aqueous but is typically immiscible with the apolar liquid.

Generally, difunctional or polyfunctional electrophilic monomer is preferably coated from an apolar liquid, although the monomer can optionally be delivered from a vapor phase (for monomers having sufficient vapor pressure). The electrophilic monomer can be aromatic in nature and can contain two or more, for example three, electrophilic groups per molecule. In the case of acyl halide electrophilic monomers, because of the relatively lower cost and greater availability, acyl chlorides are generally more suitable than the corresponding bromides or iodides. A suitable polyfunctional acyl halide is trimesoyl chloride (TMC). The polyfunctional acyl halide can be dissolved in an apolar organic liquid in a range of, for example, from about 0.01 to about 10.0 weight percent or from about 0.05 to about 3 weight percent, and delivered as part of a continuous coating operation. Suitable apolar liquids are those which are capable of dissolving the electrophilic monomers, for example polyfunctional acyl halides, and which are immiscible with a polar liquid, for example water. In particular, suitable polar and apolar liquids can include those which do not pose a threat to the ozone layer and yet are sufficiently safe in terms of their flashpoints and flammability to undergo routine processing without having to undertake extreme precautions. Higher boiling hydrocarbons, i.e., those with boiling points greater than about 90° C., such as $C_8$-$C_{24}$ hydrocarbons and mixtures thereof, have more suitable flashpoints than their $C_5$-$C_7$ counterparts, but they are less volatile.

Once brought into contact with one another, the electrophilic monomer and nucleophilic monomer react at the surface interface between the polar mixture and the apolar mixture to form a polymer, for example polyamide, discriminating layer. The reaction time is typically less than one second, but contact time is often longer, for example from one to sixty seconds, after which excess liquid may optionally be removed, e.g., by way of an air knife, water bath(s), dryer, and the like. The removal of the excess polar mixture and/or apolar mixture can be conveniently achieved by drying at elevated temperatures, e.g., from about 40° C. to about 120° C., although air drying at ambient temperatures may be used.

Through routine experimentation, those skilled in the art will appreciate the optimum concentration of the monomers, given the specific nature and concentration of the other monomer, nanoparticles, reaction conditions, and desired membrane performance.

In a further aspect, the method comprises the steps of soaking a polysulfone membrane in an aqueous solution comprising m-phenylenediamine, and pouring onto the soaked polysulfone membrane a hexane solution comprising trimesoyl chloride and zeolite nanoparticles suspended in the hexane solution, thereby interfacially-polymerizing the m-phenylenediamine and the trimesoyl chloride to form a film, wherein the zeolite nanoparticles are dispersed within the film. In a yet further aspect, the nanoparticles comprise Zeolite A. In a yet further aspect, the method can further comprise the step of contacting the zeolite nanoparticles with a silver salt. For example, the zeolite can be contacted with a silver salt prior to interfacially polymerizing a first monomer (e.g., m-phenylenediamine) and a second monomer (e.g., trimesoyl chloride) to form a film, thereby producing silver-exchanged zeolite nanoparticles dispersed within the film.

d. Nanoparticles

In one aspect, nanoparticles used in connection with the membranes of the invention can be used in connection with the methods of the invention. Typically, the nanoparticles are provided as part of the polar mixture or as part of the apolar mixture. In one aspect, the nanoparticles are selected so as to be miscible with both the polar liquid and the apolar liquid.

Through routine experimentation, those skilled in the art will appreciate the optimum concentration of the nanoparticles, given the specific nature and concentration of the first monomer, second monomer, reaction conditions, and desired membrane performance.

6. Nanocomposite Membrane with Hydrophilic Layer

In a further aspect, the method of the invention comprises the steps of providing an aqueous mixture comprising water, a hydrophilic polymer, nanoparticles, and optionally, at least one crosslinking agent; providing a polymer film that is substantially permeable to water and substantially impermeable to impurities; contacting the mixture and the film, thereby forming a hydrophilic nanocomposite layer in contact with the film; and evaporating at least a portion of the water from the hydrophilic nanocomposite layer. In a yet further aspect, the method further comprises the step of heating the layer to a temperature sufficient to crosslink the crosslinking agent.

a. Aqueous Mixture

In one aspect, the method involves providing an aqueous mixture comprising water, a hydrophilic polymer, nanoparticles, and optionally, at least one crosslinking agent. The components can be combined in any order; however, in one aspect, the nanoparticles can be added to a mixture of the hydrophilic polymer and water. In one aspect, the crosslinking agent can be added after the other three components have been combined.

Typically, the water is fresh water; however, in one aspect, the water can be salt water. Similarly, the water can include other dissolved materials.

While it is contemplated that the hydrophilic polymer can comprise any hydrophilic polymer known to those of skill in the art, the polymer, in one aspect, can comprise at least one of polyvinyl alcohol, polyvinyl pyrrole, polyvinyl pyrrolidone, hydroxypropyl cellulose, acrylic acids, poly(acrylic acids), polyethylene glycol, saponified polyethylene-vinyl acetate copolymer, triethylene glycol, or diethylene glycol or a mixture thereof. In one aspect, the hydrophilic polymer comprises crosslinked polyvinyl alcohol.

It is also understood that the hydrophilic polymer can further comprise the nanoparticles of the invention disposed within the polymer. In a further aspect, the nanoparticles can be substantially encapsulated within the hydrophilic polymer. For example, the film can comprise a crosslinked polymer, and the nanoparticles can be substantially encapsulated within the polymer matrix of the polymer.

At least one crosslinking agent is optionally provided in the method. That is, in one aspect, the hydrophilic polymer can comprise a crosslinked hydrophilic polymer. In a further aspect, the hydrophilic layer can comprise a non-crosslinked hydrophilic polymer.

b. Polymer Film

In one aspect, the method involves providing a polymer film that is substantially permeable to water and substantially impermeable to impurities. The polymer film can comprise any film known to those of skill in the art; however, in one aspect, suitable films include known thin film composite membranes, nanofiltration membranes, as well as the nanocomposite membranes of the invention. That is, it is contemplated that the nanoparticles of the invention can be optionally provided with the polymer film of the invention and that, in one aspect, the polymer film can have the components and properties of the nanocomposite membranes of the invention. In a further aspect, the nanoparticles of the invention can be absent from the polymer film of the invention, and the polymer film can have the components and properties of known thin film composite membranes or nanofiltration membranes.

c. Contacting Step

In one aspect, nanoparticles of the invention can be dispersed in a stirred polyvinyl alcohol (PVA) aqueous solution to form a PNA-nanoparticle aqueous suspension. Ultrasonication can be used to ensure complete dispersion of the nanoparticles. A given amount of cross-linking agent (CL) (e.g., fumaric acid, maleic anhydride, or malic acid) can be dissolved in the aqueous suspension with stirring at 50° C. overnight, and then cooled and degassed.

Next, a thin film nanocomposite membrane, a thin film composite membrane or a nanofiltration membrane can be contacted with the PVA-nanoparticle-CL aqueous suspension, allowing water to evaporate at room temperature, and then cross-linking PVA at increased temperature over approximately 5 to 10 minutes. The resulting thin film nanocomposite membranes possess superior flux, rejection, and fouling resistance.

E. METHODS OF USING THE MEMBRANES

In certain aspects, the membranes of the invention can be used in filtration methods that are well-known to those of skill in the arts of filtration techniques. For example, the membranes can be used to purify a liquid by removing impurities dissolved, suspended, or dispersed within the liquid as it is passed through the membrane. In a further example, the membranes can be used to concentrate impurities by retaining the impurities dissolved, suspended, or dispersed within a liquid as the liquid is passed through the membrane.

1. Purifying Liquids

In one aspect, the invention can be used for reverse osmosis separations including seawater desalination, brackish water desalination, surface and ground water purification, cooling tower water hardness removal, drinking water softening, and ultra-pure water production.

The feasibility of a membrane separation process is mainly determined by stability in water flux and solute retention with time. Fouling, and in particular biological fouling, can alter the selectivity of a membrane and causes membrane degradation either directly by microbial action or indirectly through increased cleaning requirements. These characteristics can have a direct effect on the size of the membrane filtration plant, the overall investment costs, and operating and maintenance expenses. By applying the membranes and methods of the invention to commercial membrane and desalination processes, the overall costs can be significantly reduced due to the improved selectivity and fouling resistance of the nanocomposite membranes of the invention. Due to antibiotic properties of the nanoparticles, in particular silver-exchanged Zeolite A nanoparticles, disposed within the nanocomposite membranes, less frequent chemical cleanings and lower operating pressures are typically required, thereby offering additional savings to owners and operators of these processes.

In one aspect, the membranes of the invention can be used in a method for purifying water comprising the steps of providing a nanocomposite membrane of the invention or a product of the methods of the invention, wherein the membrane has a first face and a second face; contacting the first face of the membrane with a first solution of a first volume having a first salt concentration at a first pressure; and contacting the second face of the membrane with a second solution of a second volume having a second salt concentration at a second pressure; wherein the first solution is in fluid communication with the second solution through the membrane, wherein the first salt concentration is higher than the second salt concentration, thereby creating an osmotic pressure across the membrane, and wherein the first pressure is sufficiently higher than the second pressure to overcome the osmotic pressure, thereby increasing the second volume and decreasing the first volume.

In further aspects, the invention can be used for reverse osmosis separations including liquids other than water. For example, the membranes can be used to remove impurities from alcohols, including methanol, ethanol, n-propanol, isopropanol, or butanol. Typically, suitable liquids are selected from among liquids that do not substantially react with or solvate the membranes.

2. Concentrating Impurities

In one aspect, the invention can be used in isolation techniques for recovering an impurity—for example a valuable product—from a liquid, for example water or one or more alcohols. The impurities thereby collected can be the product of a chemical or biological reaction, screening assay, or isolation technique, for example, a pharmaceutically active agent, or a biologically active agent or a mixture thereof.

In one aspect, the membranes of the invention can be used in a method for concentrating an impurity comprising the steps of providing a nanocomposite membrane of the invention or a product of the methods of the invention, wherein the membrane has a first face and a second face; contacting the first face of the membrane with a first mixture of a first volume having a first impurity concentration at a first pressure; contacting the second face of the membrane with a second mixture of a second volume having a second impurity concentration at a second pressure; and collecting the impurity, wherein the first mixture is in fluid communication with the second solution through the membrane, wherein the first impurity concentration is higher than the second impurity concentration, thereby creating an osmotic pressure across the membrane, and wherein the first pressure is sufficiently higher than the second pressure to overcome the osmotic pressure, thereby increasing the second volume and decreasing the first volume.

F. EXPERIMENTAL

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. and is at ambient temperature, and pressure is at or near atmospheric.

1. Preparation of Nanoparticles

Zeolite A (ZA) nanoparticles were synthesized by hydrothermal synthesis from a clear solution with a molar composition of 1.00 $Al_2O_3$:6.12 $SiO_2$:7.17 $(TMA)_2O$:0.16 $Na_2O$:345$H_2O$. H. Wang et al., Homogeneous Polymer-zeolite Nanocomposite Membranes by Incorporating Dispersible Template-removed Zeolite Nanocrystals, *J. Mater. Chem.*, 12 (2002) 3640. First, aluminum isopropoxide (+98%, Aldrich) was dissolved in a solution made from 25 wt. % aqueous tetramethylammonium hydroxide (TMA, Aldrich), 97 wt. % sodium hydroxide (Aldrich) and distilled water. Once the solution became clear, Ludox HS-30 colloidal silica (Aldrich) was added to begin a two-day aging process. The solution was then heated with stirring at 100° C. for 1 day. The colloidal ZA-water suspension was obtained by centrifugation, careful decanting, and ultrasonic re-dispersion in water.

In order to remove TMA without inducing nanoparticle aggregation, a polymer network was introduced into the colloidal ZA-water suspension. An acrylamide monomer (AM, 97%, Aldrich), crosslinker N,N'-methylenebiscarylamide (MBAM, 99%, Aldrich), and diaminosulfate initiator $(NH_4)_2S_2O_8$, (AS, +98%, Aldrich) were added to the nanoparticle suspension in water. After the monomer had dissolved, the mixture was ultrasonicated for 30 minutes to ensure complete dispersion of ZA nanoparticles. The monomer aqueous solution was then heated to 50° C. for 2 hours and 12 hours, respectively, at a heating rate of 2° C. per minute. Template-removed ZA nanoparticles can be given their antibacterial property by an ion exchange process with silver salt. This was carried out by adding ZA nanoparticles to a gently stirred 0.1 M solution of $A_gNO_3$ at room temperature for 12 h. A. M. P. McDonnell et al., Hydrophilic and antimicrobial zeolite coatings for gravity-independent water separation, *Adv. Functional Mater.* 15 (2005) 336.

2. Preparation of Nanocomposite Membrane a. Synthesis

ZA-PA thin film nanocomposite membranes were cast on pre-formed polysulfone ultrafiltration (UF) membranes through an interfacial polymerization reaction. The UF membranes were placed in aqueous solution of 2% (w/v) m-phenylenediamine (MPD, 99%, Aldrich) for approximately 10 minutes and the MPD soaked support membranes were then placed on a paper towel and rolled with a soft rubber roller to remove excess solution. For the interfacial polymerization reaction, a hexane solution consisting of 0.1% (w/v) trimesoly chloride (TMC, 98%, Aldrich) was poured on top. A. P. Rao et al., Structure-performance Correlation of Polyamide Thin Film Composite Membranes: Effect of Coating Conditions on Film Formation, *Journal of Membrane Science*, 211 (2003) 13. For the ZA-PA nanocomposite membranes, a measured amount of ZA nanoparticles were added to the TMC-hexane solution, and the resultant suspension was ultrasonicated for 1 h in order to ensure good dispersion of the ZA nanoparticles. The MPD-water soaked UF support membrane as then contacted with the ZA-TMC-hexane solution. After 1 minute of reaction, the TMC solution was poured off, and the resulting membranes were then rinsed with 18 M-ohm de-ionized water. In some cases, the formed membranes may be contacted with a 0.2 wt % sodium carbonate solution for about 3 hours. The membranes were then thoroughly washed with and stored in a sterile container of deionized water.

b. Characterization

X-ray diffraction and energy dispersive X-ray spectroscopy (EDX) were used to confirm the crystalline structure, the Si/Al ratio, and the degree of silver exchanged into ZA nanoparticles. Morphological characterization of synthesized nanoparticles and membranes was carried out using scanning electron microscopy (SEM). Zeta potential of the nanoparticles was measured by particle electrophoresis. The surface (zeta) potential and the (sessile drop) contact angles of the synthesized membranes were measured by streaming potential analyzer and contact angle goniometer, respectively. Surface topography of synthesized membranes was determined by atomic force microscopy (AFM).

c. Performance

The PA and ZA-PA nanocomposite membranes were evaluated for pure water permeability and solute rejection. The pure water flux was measured using a high-pressure chemical resistant dead-end stirred cell (Sterlitech HP4750 Stirred Cell). Circular membrane samples with a diameter of 49 mm were placed in the test cell with the active separation layer facing the cell reservoir. The membrane was supported on the porous stainless steel membrane disc with a Buna-N O-ring around it to ensure leak-free operation. The effective membrane area for water and solute permeation was approximately 14.6 cm$^2$. One distinction is that the dead-end filtration configuration leads to higher concentration in the feed reservoir as water permeated through the membrane, and hence, flux decreases with time as the feed reservoir solute concentration (and resulting trans-membrane osmotic pressure) increases. Without wishing to be bound by theory, since solute rejection is known to decrease as feed concentration increases and as water flux decreases (M. Mulder, *Principles of Membrane Technology*, 2$^{nd}$ Edition, 1996, Kluwer Press, Amsterdam, The Netherlands), it is believed that the values of solute rejection are substantially lower than those that would be achieved in a hydrodynamically optimized spiral wound element.

Pure water flux experiments were performed using 18 M-ohm de-ionized water. The operating pressure was set at 180 psi and the flow of water was measured volumetrically and by mass determination on a calibrated electronic balance. Solute rejection tests were performed using separate 2,000 mg/L solutions of NaCl, MgSO$_4$, and poly(ethylene glycol) (PEG). Salt concentrations in the feed and permeate water measured by a digital conductivity meter that was calibrated daily. PEG concentrations in the feed and permeate were determined by total organic carbon analysis. Solute rejections were determined from $1-C_p/(C_{f,0}-C_{f,e})$, where $C_p$ is the permeate (filtered) water concentration, $C_{f,0}$ is the initial feed water concentration, and $C_{f,e}$ is the final feed water concentration. During the entire test, a high rate of stirring was maintained using a Teflon-coated magnetic stir bar to reduce concentration polarization.

An experimental system designed to facilitate visual quantification of microbial cell deposition onto synthesized membranes was employed. S. Kang et al., Direct Observation of Biofouling in Cross-flow Microfiltration: Mechanisms of Deposition and Release, *Journal of Membrane Science*, 244 (2004) 151-165. The experimental system described in Kang et al., was operated without flux through the membrane in order to determine the rate and extent of heterogeneous adsorption of bacteria cells onto the synthesized membranes. S. Wang et al., Direct Observation of Microbial Adhesion to Membranes, *Environmental Science & Technology* 39 (2005) 6461-6469. Without wishing to be bound by theory, it is believed that visual confirmation of cell deposition onto membranes provides a more direct quantification of the propensity of a membrane to foul than simple of flux decline while filtering a suspension of fouling material. Without wishing to be bound by theory, it is also believed that flux decline is an indirect and misleading measure of fouling because it can be biased by various factors such as membrane hydraulic resistance, salt rejection, and concentration polarization. E. M. V. Hoek and M. Elimelech, Cake-Enhanced Concentration Polarization: A New Mechanism of Fouling for Salt Rejecting Membranes 37 (2003) 5581-5588.

In selected experiments, as synthesized and silver exchanged (AgX) Zeolite A nanoparticles were convectively deposited onto the surfaces of pure polyamide composite membrane samples in order to quantify (visually) the antimicrobial efficacy of the silver exchanged nanoparticles. Live bacteria cell, *Pseudomonas putida*, suspension in water with NaCl concentration of 10 mM (58.5 mg/L) and unadjusted pH were pumped through the direct microscopic observation filtration cell in three separate experiments. In the first experiment, a sample of pure PA composite membrane was tested. In the second experiment, a sample of ZA-PA nanocomposite membrane was tested. In the third experiment, a sample of AgX-ZA-PA nanocomposite membrane was tested. The cell suspension was filtered through the system for 30 minutes, at which time the experiment was stopped and the membrane samples were stained using the Live/Dead BacLight bacterial viability kit. B. K. Li and B. E. Logan, The impact of ultraviolet light on bacterial adhesion to glass and metal oxide-coated surface, *Colloids and Surfaces B-Biointerfaces* 41 (2005) 153-161.

d. Results

The crystal structure of synthesized ZA nanoparticles was confirmed by matching the X-ray diffraction (XRD) patterns (not shown) with the Joint Committee on Powder Diffraction Standards (JCPDS) files. FIG. 1 shows that as formed LTA-type zeolite nanoparticles exhibit particles sizes ranging from about 50 to about 200 nm in this example. According to energy dispersive X-ray spectroscopic analysis, the Si/Al ratio of as synthesized Zeolite A was 1.5 and the degree of silver ion exchange was 90%. Additional characterization data is provided in Table 1. Dynamic light scattering confirmed the average hydrodynamic radius in de-ionized water to be 140 nm, thus, indicating good dispersability of ZA nanoparticles in water. Zeta potential of the nanoparticles determined from measured electrophoretic mobility was −45±2 mV, when dispersed in an aqueous 10 mM NaCl electrolyte at unadjusted pH of 6.

TABLE 1

Properties of synthesized ZA nanoparticles

| Crystal Structure | Particle size by SEM [nm] | DLS datum [nm] | Zeta potential [mV] |
|---|---|---|---|
| A | 50-200 | 140 | −45 ± 2 |

Figure 2:
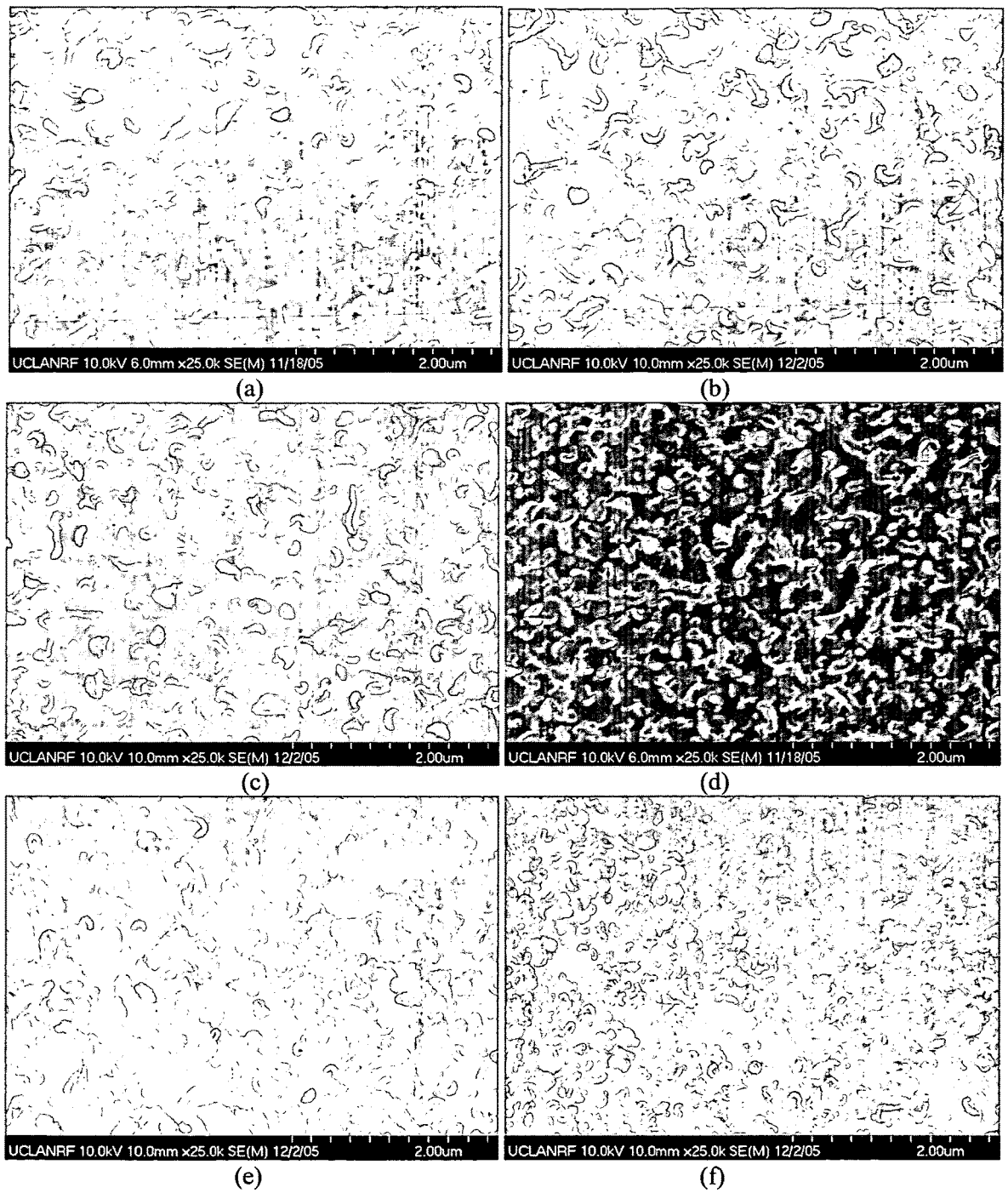
FIG. 2 shows representative SEM images of synthesized pure polyamide and zeolite-polyamide nanocomposite membranes. A hand cast thin film composite (TFC) polyamide membrane is shown in (a) and hand cast thin film nanocomposite (TFN) membranes synthesized with increasing concentrations zeolite nanoparticles are shown in (b) through (f).

FIGS. 2(*a*) and (*b*) show representative SEM images of PA and ZA-PA nanocomposite membranes, respectively. Also generally shown are TEM images of TFC/TFN-0.04% membranes. XYZ indicates the concentration (w/v) of zeolite dispersed in the hexane-TMC initiator solution: (a) XYZ=0.000%, (b) XYZ=0.004%, (c) XYZ=0.010%, (d) XYZ=0.040%, (e) XYZ=0.100%, and (f) XYZ=0.400%. The surface of the PA membrane exhibited the familiar "hill and valley" structure. For the ZA-PA membrane, however, nanoparticles appeared well dispersed in the polyamide film and the typical surface structure of an interfacially polymerized RO membrane was not found. Furthermore, at high magnification no voids were observed between nanoparticles and the polyamide matrix, suggesting good zeolite-polymer contact.

Table 2 shows the three key properties that are representative of PA and ZA-PA membranes. Pure water contact angle and surface (zeta) potential for the ZA-PA membrane were 10 degrees lower and 4 mV more negative, respectively, suggesting a more hydrophilic surface. There was a decrease in the surface roughness ($R_{RMS}$, z-data standard deviation) for the ZA-PA membrane compared to the pure PA membrane, indicating that the surface of the ZA-PA membrane is much smoother. Thus, ZA-PA membranes provide improved energy efficiency, separation performance, and fouling resistance in water purification processes.

TABLE 2

Surface Properties of Synthesized Membranes.

| Membrane | Pure Water Contact angle [°] | Surface (zeta) potential @ pH 7 [mV] | Surface roughness R[nm] |
|---|---|---|---|
| PA | 77.6 ± 0.4 | −13.1 | 73.0 |
| ZA-PA | 62.2 ± 0.8 | −17.4 | 65.6 |

TABLE 3

Performance and Properties of Synthesized Membranes

| Membrane Designation | NP Loading (% w/v) | Permeability (m/Pa-s) × $10^{12}$ | Solute Rejection NaCl* [%] | MgSO$_4$* | PEG200* | Contact Angle (°) | AFM Roughness Ra [nm] | SAD [%] |
|---|---|---|---|---|---|---|---|---|
| TFC | 0.001 | 2.1 ± 0.1 | 90.4 ± 1.5 | 91.7 ± 1.6 | 93.1 ± 1.4 | 75.4 ± 2.1 | 43.3 ± 2.2 | 31.5 ± 0.8 |
| TFN-004 | 0.004 | 2.1 ± 0.1 | 91.0 ± 1.1 | 92.5 ± 1.3 | 95.4 ± 1.4 | 64.4 ± 6.3 | 63.6 ± 9.6 | 72.4 ± 7.6 |
| TFN-010 | 0.010 | 2.4 ± 0.1 | 91.4 ± 1.1 | 92.3 ± 1.1 | 95.3 ± 1.0 | 52.7 ± 7.4 | 58.7 ± 2.6 | 68.3 ± 8.9 |
| TFN-040 | 0.040 | 2.8 ± 0.2 | 91.6 ± 0.9 | 92.6 ± 0.6 | 93.8 ± 0.7 | 42.1 ± 1.4 | 44.3 ± 2.7 | 26.6 ± 3.6 |
| TFN-100 | 0.100 | 3.1 ± 0.1 | 90.8 ± 0.6 | 92.5 ± 0.6 | 95.3 ± 0.6 | 35.9 ± 2.3 | 58.9 ± 10 | 46.2 ± 7.7 |
| TFN-400 | 0.400 | 3.7 ± 0.3 | 91.2 ± 0.5 | 93.2 ± 0.4 | 96.4 ± 0.3 | 33.1 ± 8.2 | 44.3 ± 6.8 | 39.3 ± 4.0 |

*2,000 mg/L feed concentration, 180 psi applied pressure

TFC and TFN membranes were evaluated for pure water flux and solute rejection in a high-pressure chemical resistant stirred cell (HP4750 Stirred Cell, Sterlitech Corp., Kent, Wash.). The concentration of Zeolite A nanoparticles in TFN were varied from 0.0 to 0.4% (w/v). Rejection was determined using 2,000 ppm solutions of NaCl, MgSO$_4$, and PEG 200 (poly-ethylene glycol with 200 Da nominal molecular weight). Three coupons from each membrane were evaluated for the flux and solute rejection, and the obtained results were summarized in Table 1. The membrane designation of TFC refers to pure MPD-TMC polyamide thin film composite membranes, whereas TFN-XYZ refers to Zeolite A-polyamide thin film nanocomposite membranes made with 0.XYZ % (w/v) of Zeolite A nanoparticles dispersed in the hexane-TMC solution prior to the interfacial polymerization reaction used to coat the thin film layer on the polysulfone porous support.

The data of Table 3 indicate that the TFN membrane performance is superior to the TFC performance with respect to both pure water permeability and solute rejection and for all three solutes. In addition, with increasing nanoparticle loading, the permeability increases, the pure water contact angle decreases (i.e., the membranes become more hydrophilic), and certain key surface roughness parameters decrease (i.e., the membranes become smoother).

Fractional surface coverages of bacteria cells at different cross-flow velocities (15, 25, 40 and 200 mm s$^{-1}$) are listed in Table 4. The net deposition rate was lower for the ZA-PA nanocomposite membrane, especially as cross-flow was increased, indicating that the nanocomposite membranes is easier to clean than pure polyamide membranes. Without wishing to be bound by theory, it is believed that the difference in cell deposition and adhesion can be attributed to the increased hydrophilicity and smoothness seen in the data of Tables 2 and 3.

TABLE 4

Impact of cross-flow velocity on deposition rate.

| | Cross-flow velocity [mm s$^{-1}$] | | | |
|---|---|---|---|---|
| Membrane | 15 | 25 | 40 | 200 |
| PA | 23.1% | 22.7% | 21.5% | 14.6% |
| ZA-PA | 16.0% | 16.6% | 17.1% | 6.3% |

Figure 3:
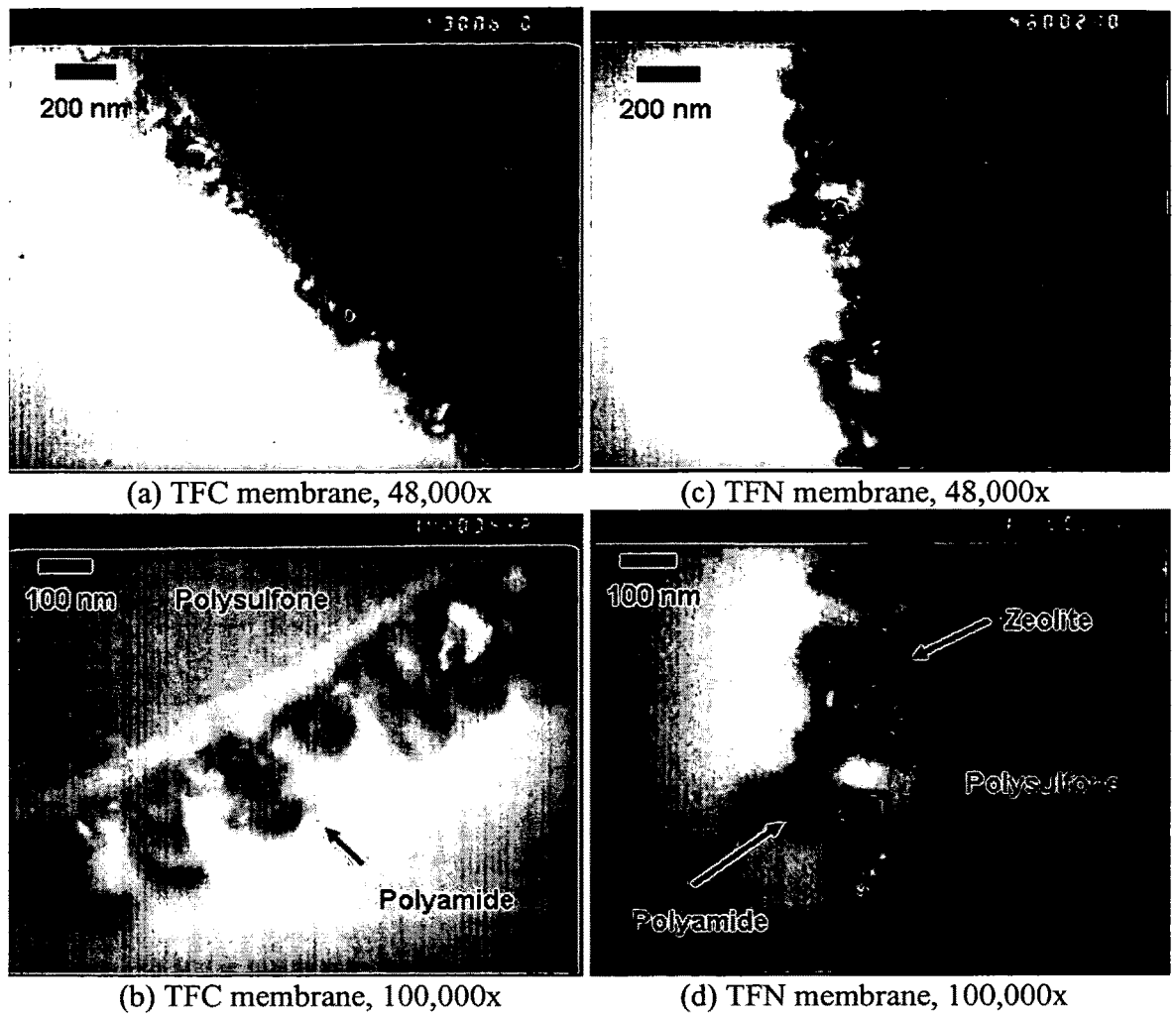
FIG. 3 shows representative TEM images of hand cast pure polyamide TFC at magnifications of (a) 48 k X and (b) 100 k X and hand cast and zeolite-polyamide TFN membranes at magnifications of (c) 48 k X and (d) 100 k X.

FIG. 3 shows representative TEM images of synthesized pure polyamide [(a) and (b)] and zeolite-polyamide nanocomposite [(c) and (d)] membranes. The polysulfone support, which contains relatively heavy sulfur atoms, appears darker than the polyamide polymer matrix and can thus be easily distinguished from it. The characteristic porous texture of polysulfone also aids in distinguishing between polyamide polymer matrix and polysulfone. All membranes were relatively rough, which can be a general feature of interfacially polymerized polyamide composite membranes, and thus the thickness of polyamide layer was in the range of 100-300 nm in this example. As can be seen from SEM images for TFN membranes, zeolite nanoparticles, which appear considerably darker than the polyamide layer, were located in the polyamide polymer matrix layer. Without wishing to be bound by theory, it is believed that higher flux of pure water for TFN membranes is due to the introduction of zeolite nanoparticles into the polyamide polymer matrix layer.

3. Preparation of Nanocomposite Membrane with Hydrophilic Layer a. Thin Film Nanocomposite (TFN) Membrane Formation TFN membranes can be formed on microporous polysulfone support membranes through an interfacial polymerization reaction. The microporous support is immersed in an aqueous solution of 2 wt % MPD for approximately two minutes. Next, the MPD soaked support membranes can be placed on a rubber sheet and rolled with a rubber roller to remove excess MPD solution. The support membrane can then be contacted with a hexane solution consisting of 0.1 wt % TMC and 0.001 to 1.0 wt % as-synthesized Zeolite A (ZA) nanoparticles. The nanoparticles can be dispersed in the TMC solution by ultrasonication for 20-60 minutes prior to the reaction. After 1 minute of reaction, the TMC-ZA solution is poured off, and the resulting membranes rinsed with an aqueous solution of 0.2 wt % sodium carbonate. Modifications to the formation conditions, as well as post-treatments described herein, can be applied to formation of thin film nanocomposite membranes.

b. Surface Modification of TFN Membranes

Zeolite A nanoparticles may be dispersed in 0.1-1.0 wt % PVA aqueous solutions under vigorous stirring for ~5 hours to make the PVA-ZA aqueous suspensions at various weight ratios ranging from 99:1 to 50:50 (PVA:ZA). Ultrasonication may be further required (as described above) to ensure complete dispersion. A given amount of cross-linking (CL) agent (e.g., fumaric acid, maleic anhydride, or malic acid) may be dissolved in the aqueous suspension with stirring at 50° C. overnight, and then cooled and degassed. A TFC or TFN membrane may be contacted with the PVA-ZA-CL aqueous suspension, allowing water to evaporate at room temperature, and then cross-linking PVA at 80°-120° C. for 5-10 minutes. The resulting PA-PVA/ZA or PA/ZA-PVA/ZA thin film nanocomposite membrane possesses superior flux, rejection, and fouling resistance.

4. Purification of Water using Nanocomposite Membrane

Basic procedures for purification of water using polymeric membranes are well-known to those of skill in the art. A simple procedure for the purification of water using a membrane and for determining pure water flux, salt rejection, concentration polarization, and fouling phenomena has been described in E. M. V. Hoek et al., "Influence of crossflow membrane filter geometry and shear rate on colloidal fouling in reverse osmosis and nanofiltration separations," *Environmental Engineering Science* 19 (2002) 357-372 and is summarized below. Simple characterization of a membrane's ability to purify a particular water sample is described in step (d), below.

a. Laboratory-Scale Crossflow Membrane Filter

Suitable membrane filtration units include a modified or unmodified version of a commercially available stainless steel crossflow membrane filtration (CMF) unit (Sepa C F, Osmonics, Inc.; Minnetonka, Minn.) rated for operating pressures up to 6895 kPa (1000 psi). Applied pressure (ΔP) should be maintained constant and monitored by a pressure gage (Cole-Parmer) and flux should be monitored in real time by a digital flow meter (Optiflow 1000, Humonics; Rancho Cordova, Calif.) or by directly measuring the volume of water permeated per unit time.

b. Measuring Membrane Hydraulic Resistance

A different membrane coupon is typically used for each filtration experiment to determine a membrane's intrinsic hydraulic resistance. First, deionized (DI) water is circulated at about 250 psi (1724 kPa) for up to 24 hours to dissociate any flux decline due to membrane compaction (and other unknown causes inherent of lab-scale recirculation systems). Flux can be monitored continuously for the duration of the experiment. After DI equilibration, the pressure can be changed in increments of 50 psi (345 kPa), from a high of 250 psi to a low of 50 psi and flux recorded at a feed flow rate of 0.95 liters per minute (Lpm). At each pressure, flux is typically monitored for at least 30 minutes to ensure stable performance. The crossflow can then be increased to 1.90 Lpm and flux recorded at 50 psi increments from 50 psi to 250 psi. Finally, feed flow rate can be set to 3.79 Lpm and the flux recorded at 50 psi increments from 250 psi down to 50 psi. At each crossflow and pressure, the average of all of the stable flux measurements can then be plotted against applied pressure. The slope of a line fitted to pure water flux versus pressure data by a least squares linear regression provides the membrane hydraulic resistance, $R_m$. There is typically no measured influence of feed flow rate on pure water flux, but the procedure provides extra data points for the regression analysis. The pH, turbidity, and conductivity of feed is typically monitored throughout the pure water flux experiments to ensure constant feed conditions.

c. Measuring CP Modulus and Initial Osmotic Pressure Drop

After the membrane pure water hydraulic resistance is determined, concentration polarization effects can be quantified using the velocity variation techniques. The concentration polarization modulus is the ratio of rejected solute concentration at the membrane surface divided by the bulk solute concentration. An appropriate volume of 1 M stock NaCl solution is typically added to the feed tank to provide the desired experimental ionic strength. The sequence of varying applied pressure and feed flow rate is typically repeated, as described above. The effective osmotic pressure drop across the membrane ($\Delta\pi$) for each combination of feed velocity and applied pressure is typically determined from $J=A(\Delta p-\Delta\pi)$ where $J$ is the water flux, $\Delta p$ is the applied pressure, and $A=1/R_m$. Since the feed and permeate salt concentrations can be directly measured, the membrane concentration is obtained from $\Delta\pi=f_{os}(c_m-c_p)$, where $c_m$ and $c_p$ are the salt concentrations at the membrane surface and in the permeate and fos is a coefficient that converts molar salt concentration to osmotic pressure (~2RT for NaCl at dilute concentrations; R=8.324 J/mol·K, T=absolute temperature, K). Once $c_p$, is known, the concentration polarization modulus ($c_m/c_p$) is directly calculated.

d. Measuring Decline in Flux Due to Fouling

After the salt water experiments are finished, pressure and crossflow are typically adjusted to produce the desired initial flux and wall shear for the fouling experiment. After stable performance (water flux and salt rejection) are achieved for a minimum of about 60 minutes, a dose of model are added to the feed tank to provide the appropriate foulant feed concentration. If real waters (e.g., "natural" water from environmental or industrial samples) are to be tested, then the feed tank and system are typically completely emptied, rinsed, and drained prior to filling the feed tank with a volume of the test water. A "real water" is a sample of water from a water utility or water source that is being considered for purification via a membrane filtration process. The concentration of foulant materials should be monitored in the feed, retentate, and permeate throughout the duration of the experiment by an appropriate analytical technique such as, for example, turbidity, color, TOC, or particle counts depending on the nature foulant material. In addition, conductivity and pH measurements are typically made at the start, end, and at several points during the fouling experiment to monitor salt rejection and to ensure the feed solution ionic strength and pH are not changing throughout the test. The transient flux at constant pressure is typically recorded in real-time while maintaining constant flux.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for preparing a reverse osmosis membrane, comprising:
   (A) providing, on the surface of a porous support membrane, a composition comprising:
      (a) a polyamine;
      (b) a polyfunctional acyl halide; and
      (c) nanoparticles; and (B) interfacially polymerizing the polyamine and the polyfunctional acyl halide on the surface of the porous support membrane in the presence of the nanoparticles to form a reverse osmosis membrane comprising (i) the porous support membrane and (ii) a crosslinked film comprising a polyamide matrix and nanoparticles within the polyamide matrix, wherein the nanoparticles are encapsulated within the film such that at least 80% of a volume of at least 50% of the nanoparticles is positioned between surfaces of the film, and the film has a thickness from 1 nm to 1000 nm.

2. A process according to claim 1, further comprising treating the reverse osmosis membrane with an acidic aqueous solution.

3. A process according to claim 1, further comprising treating the reverse osmosis membrane with a basic aqueous solution.

4. A process according to claim 1, wherein the polyfunctional acyl halide is selected from the group consisting of trimesoyl chloride and phthaloyl chlorides.

5. A process according to claim 1, wherein the nanoparticles comprise zeolites.

6. A process according to claim 1, wherein the nanoparticles comprise carbon nanotubes.

7. A process according to claim 1, wherein the thickness of the film is from 50 nm to 500 nm.

8. A process according to claim 1, wherein the nanoparticles have an average hydrodynamic diameter from 1 nm to 1000 nm.

9. A process according to claim 1, further comprising providing a hydrophilic layer proximate the film.

10. A process according to claim 9, wherein the hydrophilic layer comprises a hydrophilic polymer selected from the group consisting of polyvinyl alcohol, polyvinyl pyrrole, polyvinyl pyrrolidone, hydroxypropyl cellulose, polyethylene glycol, saponified polyethylene-vinyl acetate copolymer, triethylene glycol, diethylene glycol, and combinations thereof.

11. A process according to claim 9, wherein the hydrophilic layer comprises nanoparticles within the hydrophilic layer.

12. A process according to claim 1, wherein the polyamine is an aromatic polyamine.

13. A process according to claim 1, wherein the polyamine is an aliphatic polyamine.

14. A process according to claim 1, wherein the polyamine is selected from the group consisting of 3,5-diaminobenzoic acid, 2,4-diaminotoluene, 2,4-diaminoanisole, xylylenediamine, propylenediamine, and tris(2-diaminoethyl)amine.

15. A process according to claim 1, wherein the polyamine is selected from the group consisting of diaminobenzene, triaminobenzene, polyetherimine, ethylenediamine, and piperazine.

16. A process according to claim 1, wherein the reverse osmosis membrane has a flux of 0.03 to 0.3 gallons per square foot of the reverse osmosis membrane per day per psi of applied pressure.

17. A process according to claim 1, wherein the film has a pure water equilibrium contact angle of less than 75°.

18. A process according to claim 1, wherein the film has a zeta potential of at least as negative as −15 mV.

19. A process according to claim 1, wherein the film has a root mean squared surface roughness of less than 100 nm.

20. A process according to claim 1, wherein the reverse osmosis membrane has a salt water rejection of greater than 95 percent.

21. A process according to claim 1, wherein at least 90% of the volume of at least 50% of the nanoparticles is positioned between the surfaces of the film.

* * * * *